US007778165B2

(12) United States Patent
Madhyastha et al.

(10) Patent No.: US 7,778,165 B2
(45) Date of Patent: Aug. 17, 2010

(54) INFORMATION PLANE FOR DETERMINING PERFORMANCE METRICS OF PATHS BETWEEN ARBITRARY END-HOSTS ON THE INTERNET

(75) Inventors: Harsha V. Madhyastha, Seattle, WA (US); Thomas Anderson, Seattle, WA (US); Arvind Krishnamurthy, Seattle, WA (US); Arun Venkataramani, Northampton, MA (US)

(73) Assignee: University of Washington, Seattle, WA (US)

( * ) Notice: Subject to any disclaimer, the term of this patent is extended or adjusted under 35 U.S.C. 154(b) by 195 days.

(21) Appl. No.: 11/937,223

(22) Filed: Nov. 8, 2007

(65) Prior Publication Data

US 2009/0122697 A1    May 14, 2009

(51) Int. Cl.
*G01R 31/08* (2006.01)
(52) U.S. Cl. ...................... 370/229; 370/254
(58) Field of Classification Search ......... 370/230–235, 370/236–238, 241, 248, 252–258, 351–356, 370/229
See application file for complete search history.

(56) References Cited

U.S. PATENT DOCUMENTS

| 5,542,047 | A * | 7/1996 | Armstrong | 709/224 |
|---|---|---|---|---|
| 6,502,131 | B1 * | 12/2002 | Vaid et al. | 709/224 |
| 6,529,515 | B1 * | 3/2003 | Raz et al. | 370/401 |
| 6,578,082 | B1 * | 6/2003 | Ho et al. | 709/233 |
| 6,671,724 | B1 * | 12/2003 | Pandya et al. | 709/226 |
| 6,850,525 | B2 * | 2/2005 | Mitsumori et al. | 370/395.52 |
| 7,593,351 | B1 * | 9/2009 | Zioulas et al. | 370/255 |
| 2002/0131369 | A1 * | 9/2002 | Hasegawa et al. | 370/241 |
| 2006/0020686 | A1 * | 1/2006 | Liss et al. | 709/219 |
| 2006/0203739 | A1 * | 9/2006 | Padmanabhan et al. | 370/252 |
| 2006/0274760 | A1 * | 12/2006 | Loher | 370/395.52 |
| 2007/0198680 | A1 * | 8/2007 | Krishnaswamy | 709/223 |
| 2007/0211627 | A1 * | 9/2007 | Pike et al. | 370/230 |
| 2008/0086469 | A1 * | 4/2008 | Gu et al. | 707/6 |
| 2008/0253301 | A1 * | 10/2008 | Keromytis et al. | 370/252 |
| 2009/0080336 | A1 * | 3/2009 | Zhang et al. | 370/248 |

OTHER PUBLICATIONS

Madhyastha et al, A Structural Approach to Latency Prediction, IMC'06 Oct. 25-27, 2006, Rio de Janerio, Brazil.*

(Continued)

*Primary Examiner*—Kwang B Yao
*Assistant Examiner*—Jung-Jen Liu
(74) *Attorney, Agent, or Firm*—Ronald M. Anderson

(57) ABSTRACT

Performance metrics between any two arbitrary end-hosts are predicted based upon previous measurements on the Internet between a plurality of geographically dispersed vantage points and clusters of end-hosts. Each cluster comprises end-hosts that are related based upon their IP address prefixes. In response to a central agent that stores the measured data for each of a plurality of predicted paths on the Internet, the vantage points use traceroute software to measure and periodically update performance metrics such as latency, bottleneck capacity, bandwidth, and packet loss rate for links comprising the predicted paths between the vantage points and one (or more) destination points associated with each cluster, and gather such data using distributed application systems. A user or client application can subsequently request predicted performance metrics for communication between specific end-hosts, based upon the previous measurement data.

25 Claims, 10 Drawing Sheets

OTHER PUBLICATIONS

H. V. Madhyastha et al., A Structureal Approach to Latency Prediction, IMC'06 Oct. 25-27, 2006, Rio de Janeiro, Brazil.*

Andersen, David, Hari Balakrishnan, Frans Kaashoek, and Robert Morris. "Resilient Overlay Networks" MIT Laboratory for Computer Science, http://nms.lcs.mit.edu/papers/ron-sosp2001.pdf.

Chen, Yan, David Bindel, Hanhee Song, and Randy H. Katz. "An Algebraic Approach to Practical and Scalable Overlay Network Monitoring" Department of Computer Science at Northwestern University, and Division of Computer Science at University of California at Berkeley, http://www.sigcomm.org/sigcomm2004/papers/p545-chen11.pdf.

Costa, Manuel, Miguel Castro, Antony Rowstron, and Peter Key. "PIC: Practical Internet Coordinates for Distance Estimation" Microsoft Research, Cambridge, CB3 0FB, UK, http://research.microsoft.com/~peterkey/Papers/PIC-ICDCS.pdf.

Dabek, Frank, Russ Cox, Frans Kaashoek, and Robert Morris. "Vivaldi: A Decentralized Network Coordinate System" MIT CSAIL, Cambridge, MA, http://pdos.csail.mit.edu/papers/vivaldi:sigcomm/paper.pdf.

Donnet, Benoit, Timur Friedman, Philippe Raoult, Mark Crovella. "Efficient Algorithms for Large-Scale Topology Discovery" Universite Pierre & Marie Curie Laboratoire LiP6-CNRS and Computer Science Department at Boston University, http://www-rp.lip6.fr/site_npa/site_rp/_publications/595-49-Donnet.pdf.

Francis, P., S. Jamin, C. Jin, Y. Jin, D. Raz, Y. Shavitt, L. Zhang. "IDMaps: A Global Internet Host Distance Estimation Service" IEEE/ACM Trans. On Networking, Oct. 2001, http://idmaps.eecs.umich.edu/papers/ton01.pdf.

Freedman, Michael J., Karthik Lakshminarayanan, and David Mazieres. "OASIS: Anycast for Any Service" New York University, U.C. Berkeley, and Stanford University, http://www.coralcdn.org/docs/oasis-nsdi06.pdf.

Ng, T.S. Eugene and Hui Zhang. "Predicting Internet Network Distance with Coordinates-Based Approaches" Carnegie Mellon University, Pittsburgh, PA. 15213, http://www.cs.rice.edu/%7Eeugeneng/papers/INFOCOM02.pdf.

Shavitt, Yuval and Tomer Tankel. "On the Curvature of the Internet and its usage for Overlay Construction and Distance Estimation" http://www.eng.tau.ac.il/~tankel/pub/HypCurvature04.pdf.

Spring, Neil, Ratul Mahajan and David Wetherall. "Measuring ISP Topologies with Rocketfuel" Computer Science and Engineering at University of Washington, Seattle, WA 98105, http://www.sigcomm.org/sigcomm2002/papers/rocketfuel.pdf.

Wong, Bernard, Aleksandrs Slivkins and Emin Gün Sirer. "Meridian: A Lightweight Network Location Service without Virtual Coordinates" Department of Computer Science at Cornell University, Ithaca NY 14853, http://www.cs.cornell.edu/~bwong/meridian/papers/paper-WonSli.pdf.

* cited by examiner

INFORMATION PLANE FOR DETERMINING PERFORMANCE METRICS OF PATHS BETWEEN ARBITRARY END-HOSTS ON THE INTERNET

GOVERNMENT RIGHTS

This invention was made with government support under Contract Nos. CNS-0435065 and CNS-0419696 awarded by the National Science Foundation. The government has certain rights in the invention.

BACKGROUND

By design, the Internet is opaque to its applications, providing best effort packet delivery with little or no information about the likely performance or reliability characteristics of different paths. While this approach is reasonable for simple client-server applications, many emerging large-scale distributed services depend on richer information about the state of the network. For example, content distribution networks like Akamai™, Coral™, and CoDeeN™ redirect each client to the replica providing the best performance for that client. Likewise, voice-over-IP systems such as Skype™ use relay nodes to bridge hosts behind network address translation (NAT) implementations and firewalls, the selection of which can dramatically affect call quality. Peer-to-peer file distribution, overlay multicast, distributed hash tables, and many other overlay services can benefit from peer selection based on different metrics of network performance, such as latency, available bandwidth, and loss rate. Finally, the Internet itself can benefit from more information about itself, e.g., ISPs can monitor the global state of the Internet for reachability and root cause analysis, routing instability, and onset of distributed denial of service (DDoS) attacks.

If Internet performance were easily predictable, its opaqueness might be an acceptable state of affairs. However, Internet behavior is well known to be fickle, with local hot spots, transient (and partial) disconnectivity, and triangle inequality violations all being quite common. Many large-scale services adapt to this state of affairs by building their own proprietary and application-specific information plane. Not only is this approach redundant, but it also prevents new applications from leveraging information already gathered by other applications. The result is often suboptimal. For example, most implementations of the file distribution tool BitTorrent™ choose peers at random (or at best, using round trip latency estimates); since downloads are bandwidth-dependent, this approach can yield suboptimal download times. By some estimates, BitTorrent accounts for roughly a third of backbone traffic, so inefficiency at this scale is a serious concern. Moreover, implementing an information plane is often quite subtle, e.g., large-scale probing of end-hosts can raise intrusion alarms in edge networks because the traffic can resemble a DDoS attack. This characteristic is the most common source of complaints on PlanetLab.

To address this concern, several research efforts, such as IDMaps™, GNP™, Vivaldi™, Meridian™, and Planet-Seer™ have investigated providing a common measurement infrastructure for distributed applications. These systems provide only a limited subset of the performance metrics of interest—most commonly latency between a pair of nodes, whereas most applications desire richer information such as loss rate and bandwidth capacity. By treating the Internet as a black box, most of these services abstract away network characteristics and atypical behavior—exactly the information of value for troubleshooting as well as improving performance. For example, the most common latency prediction methods use metric embeddings, which are fundamentally incapable of predicting detour paths, since such paths violate the triangle inequality. More importantly, being agnostic to network structure, they cannot pinpoint failures, identify the causes of poor performance, predict the effect of network topology changes, or assist applications with new functionality, such as multipath routing.

Accordingly, it would be desirable to move beyond mere latency prediction and develop a service to automatically infer sophisticated network behavior. Such a system should be able to measure or predict a plurality of different performance metrics affecting communication over the Internet (or some other form of wide area network) between two arbitrarily selected end-hosts, without requiring that the measurements of any of the performance metrics be initiated or actually carried out by either of the end-hosts. The data used to determine such performance metrics should be automatically collected and updated without normally requiring any user interaction. Further, the system that collects the data necessary for providing the performance metrics should be relatively efficient and not impose an undue burden in regard to the traffic required to collect the data.

SUMMARY

In consideration of the preceding problems with measuring performance metrics on the Internet, an exemplary embodiment of an Information Plane ("iPlane") system has been developed that continuously performs measurements to generate and maintain an annotated map of the Internet with a rich set of link and router attributes. The iPlane system uses structural information such as the router-level topology and autonomous system (AS) topology to predict paths between arbitrary nodes in the Internet. The path predictions are combined with measured characteristics of path segments to predict end-to-end path properties for a number of performance metrics such as latency, available bandwidth capacity, and loss rate. The iPlane system can also analyze isolated anomalies or obtain a global view of network behavior by correlating observations from different parts of the Internet.

The iPlane system is designed as a service that distributed applications can query to obtain information about network conditions. Deploying the iPlane system as a shared service (as opposed to providing a library) has several benefits. First, use of a single, common iPlane system can exploit the temporal and spatial locality of queries across applications to minimize redundant measurement overhead. Second, the iPlane system can selectively refresh its knowledge of the IP address space based on real query workloads. More generally, the iPlane system can assimilate measurements made on behalf of all of its clients as well as incorporate information reported by clients to develop a more comprehensive model of Internet behavior over time.

One of the primary contributions of the iPlane system is in demonstrating its feasibility and utility, e.g., an annotated map of the Internet can be inferred with high accuracy every six hours, with approximately 100 Kbps of measurement traffic per PlanetLab™ node. In addition, the iPlane system employs:

A common structural model to predict path properties.

A measurement infrastructure that is deployed on every active PlanetLab site and almost a thousand traceroute and Looking Glass™ server vantage points (with a lower intensity of probing).

A toolkit for using BitTorrent™ swarms to measure links.

Case studies of popular systems such as CDNs, peer-to-peer file swarming, and VoIP. Measurable benefits of using the iPlane system have been shown for each of these applications.

The iPlane system supplies information about the network and leaves the task of adapting or repairing to the client. Nevertheless, the collection, analysis, and distribution of Internet-scale measurement information is itself a challenging systems engineering problem. The goal of gathering a complete picture of the Internet has been recognized earlier, but one of the goals of the approach discussed herein is more modest—to gather a coarse-grained map of the Internet sufficient to be of utility in improving overlay performance.

A system such as that represented by the exemplary embodiment discussed below should be capable of meeting the following requirements:

Accuracy: the iPlane system should accurately estimate a rich set of performance metrics such as latency, loss-rate, capacity, and available bandwidth.

Wide coverage: the iPlane system must predict the performance of arbitrary Internet paths.

Scalability: the iPlane system should not impose an undue communication load on its measurement infrastructure.

Unobtrusiveness: Active probes of end-hosts must be coordinated and performed in an unobtrusive manner in order to minimize the possibility of raising intrusion detection alarms.

More specifically, an exemplary method for automatically predicting performance metrics for communication between any two arbitrary end-hosts on a network includes the step of initiating measurements of the network from a plurality of geographically distributed vantage points. Each vantage point comprises a computing device that is coupled to the network. Traceroute data obtained for links between a plurality of destination points on the network and the plurality of vantage points are used for automatically inferring information defining a structure of the network. The traceroute data are employed for automatically determining routing policies applied by routers on the network during communication between the plurality of vantage points and the plurality of destination points. The performance metrics for each link identified by the traceroute data are automatically determined. Next, the information defining the structure, and the routing policies are used to predict paths between any arbitrary end-hosts on the network. The performance metrics are then determined for links comprising each predicted path in the network.

The exemplary method further includes the step of automatically selecting the plurality of destination points so that each destination point of the plurality of destination points represents a cluster of end-hosts on the network, where each cluster includes end-hosts selected as a function of network addresses assigned to the end-hosts. Another step provides for accessing routing tables employed by routers on the network, to define the clusters of end-hosts represented by the plurality of destination points.

A user is enabled to select two arbitrary end-hosts on the network so that the performance metrics can be predicted for communication between the two arbitrary end-hosts that were selected. Clusters that include the two arbitrary end-hosts that were selected are identified, and a most likely path between the destination points representing the clusters is automatically selected. Using the performance metrics that were previously determined for the links on the most likely path, the method then predicts the performance metrics for communication between the two arbitrary end-hosts that were selected. In at least one exemplary embodiment, the step of selecting the most likely path includes the step of automatically selecting a path where the latency from a source to the point where the path exits a first-hop AS is a minimum.

When clustering the routers handling the links on the network, the method identifies the routers that are at a common location and are operated by a common network service provider. In addition, the method can resolve aliases for routers on the network, to reduce the number of routers handling different links.

Predicting the performance metrics for each of the predicted paths comprises the steps of evaluating network latencies for each link of the predicted path connecting a vantage point to a destination point, for each vantage point and each destination point, and then storing the network latency for each link. Further, this step can include the steps of measuring a bandwidth of each link of the predicted path connecting a vantage point to a destination point, for each vantage point and each destination point, and storing the bandwidth for each link. A packet loss rate of each link of the predicted path connecting a vantage point to a destination point, for each vantage point and each destination point, can also be measured, and then stored.

Another aspect of this novel approach is directed to a system for automatically predicting performance metrics for communication between any two arbitrary end-hosts on a network. The system includes a memory in which machine instructions and data are stored, a network interface for communicating over the network, and a processor that is coupled to the memory and the network interface. The processor executes the machine instructions to carry out a plurality of functions that are generally consistent with the steps of the method discussed above.

Yet another aspect of the technology is directed to a memory medium on which are stored machine readable and executable instructions. When executed by a processor, the machine instructions cause the processor to carry out a plurality of functions used for automatically predicting performance metrics for communication between any two arbitrary end-hosts on a network, in a manner that is also generally consistent with the steps of the method discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figure 1:
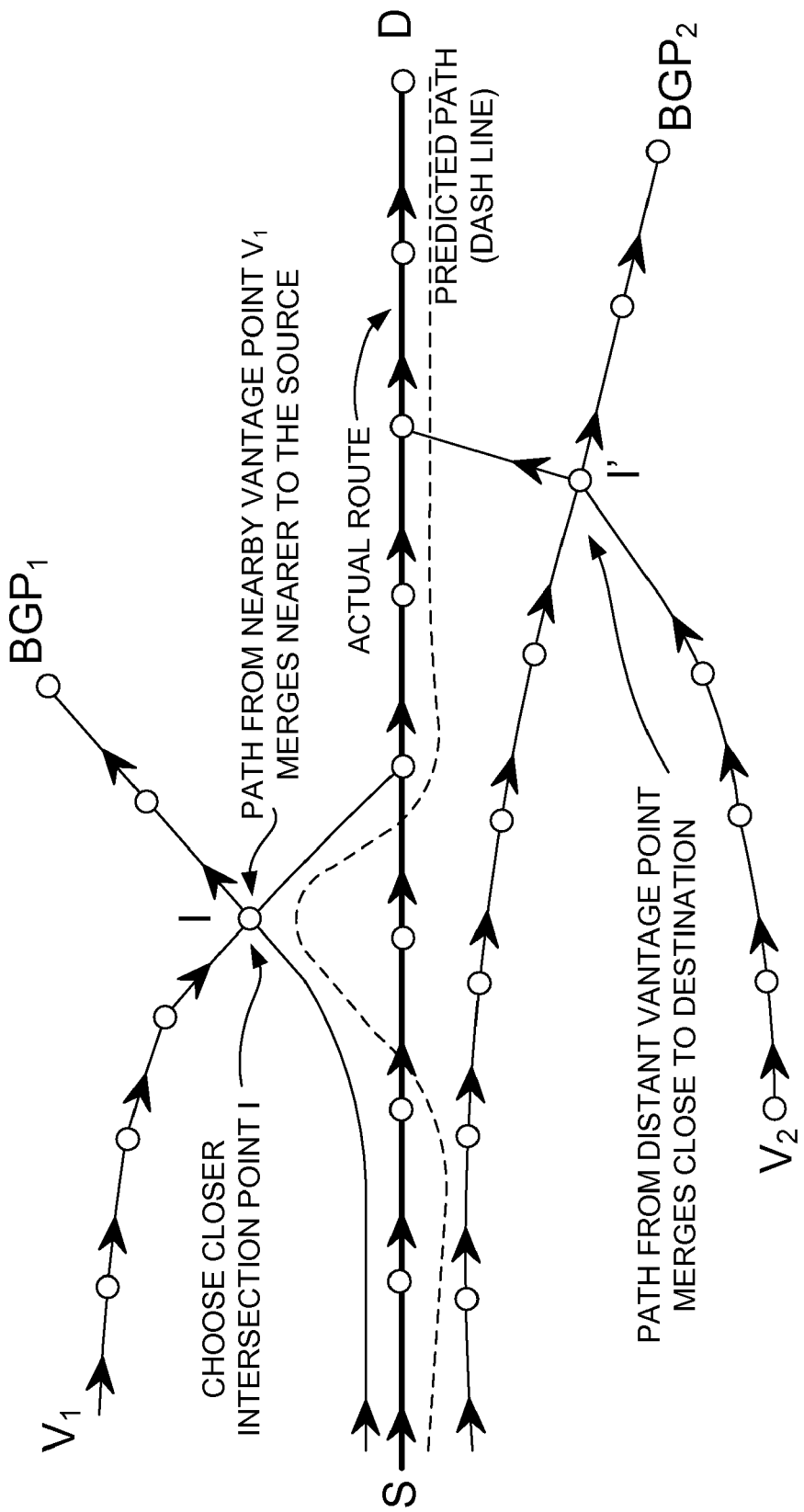
FIG. 1 is a schematic diagram illustrating a predicted and an actual path from a source "S" to a destination "D," where the predicted path is determined by composing a path from S with a path into D from a vantage point close to S (i.e., $V_1$), and wherein $BGP_1$ and $BGP_2$ are destinations in two random prefixes to which S performs traceroutes.

Figures and Disclosed Embodiments Are Not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Overview of Process

An exemplary embodiment of the present novel system is referred to herein as "the iPlane system." The iPlane system is designed to be deployed as an application-level overlay network, with the overlay nodes collectively coordinating the task of generating and maintaining an "atlas" of the Internet (or other wide area network). At this point, it must be emphasized that this novel system and procedure for predicting performance metrics between two arbitrary end-hosts is not limited only to use on the Internet network, but instead, has application to almost any type of network that is sufficiently large in scope to benefit from the capabilities of this technology. However, for purposes of simplicity, the following discussion typically only refers to the Internet as the network to which the approach is applied.

Figure 2:
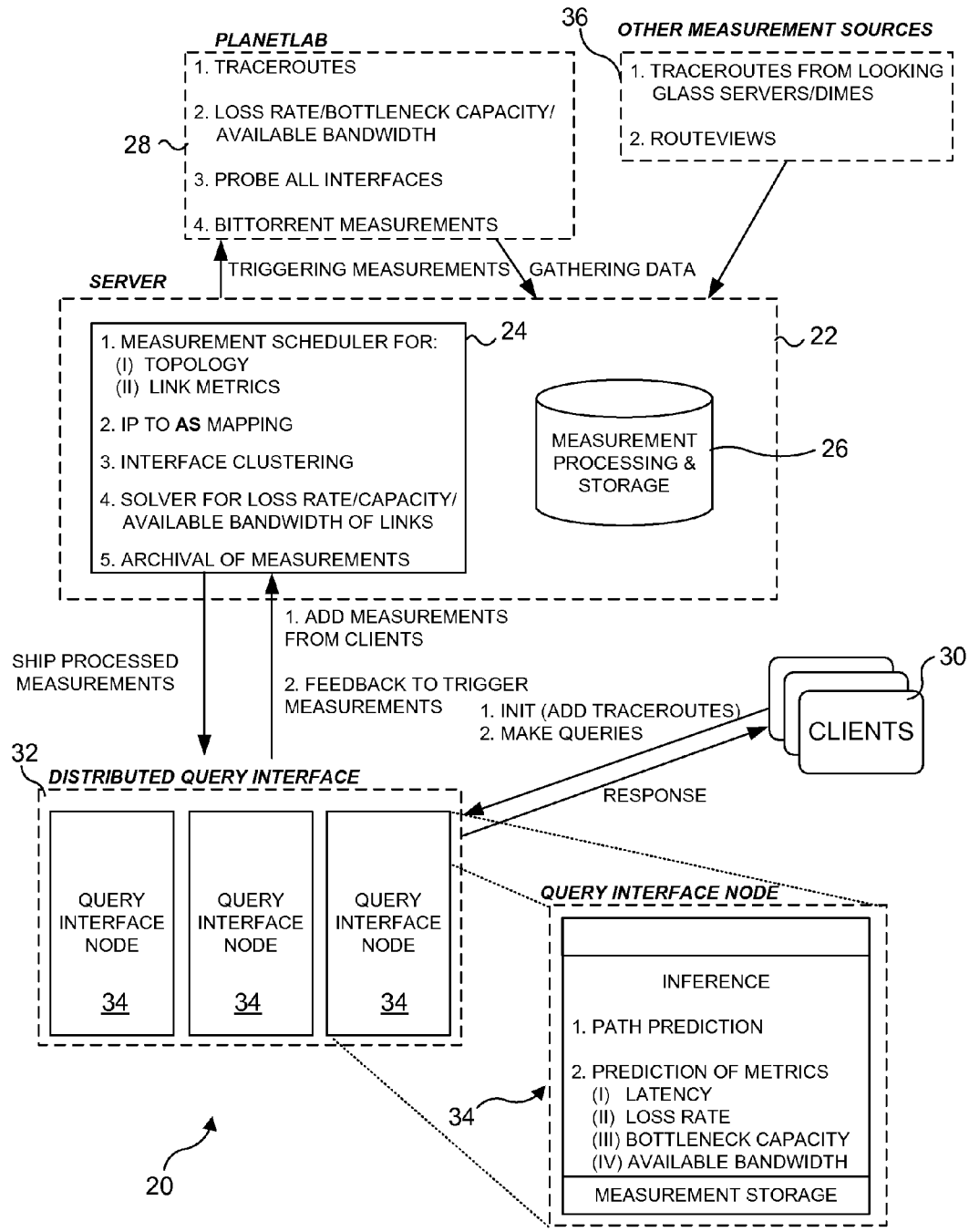
FIG. 2 is a schematic diagram of an exemplary architecture for the novel system disclosed herein (an exemplary embodiment being referred to herein as "iPlane")

FIG. 2 illustrates a schematic diagram 20 showing the various components of the exemplary iPlane system and how they interact. A server 22 (i.e., a central agent or controlling computer) runs script files or other machine instructions that cause the server to automatically periodically carry out a plurality of functions 24. The server thus produces and updates data that is usable for predicting performance metrics between any arbitrary end-hosts on a network such as the Internet. Functions 24 include scheduling measurements that determine the topology and the link metrics of the network, i.e., its structure, as well as mapping IP addresses to autonomous systems (AS) on the network. In addition, as explained in detail below, the server identifies clusters with which to interface on the network, thereby reducing the task of measuring data for the network to a reasonable level. In addition, the server solves for loss rates, capacity, and available bandwidth of the links that it employs for collecting data. The resulting data are archived in a data store 26.

To enable the server to measure data, the present exemplary embodiment uses the geographically dispersed computers of PlanetLab, as shown in a block 28. These computers, which serve as vantage points on the network, respond to triggering control signals from the server to run traceroutes for each of the clusters created and thus collect the data indicative of the loss rate, bottleneck capacity, and available bandwidth for the links being monitored. In addition, the vantage points, again under the control of the server, periodically probe all of the cluster interfaces and collect data from controlled BitTorrent™ swarms measurements, as explained in detail below. Optionally, other measurement sources 36 can be employed. For example, traceroutes can be run from Looking Glass™ servers or from the Distributed Internet MEasurements & Simulations (DIMES) project. Information about the structure of the network is also provided by data gathered from RouteViews.

Clients 30 can also optionally run traceroutes and provide measurement data; however, such client provided data is not necessary. Clients that need to determine performance metrics between specific end-hosts can interact with a query interface node 34 in a distributed query interface 32. The query interface node obtains necessary data from the data store of the server by input of a query, and by inference, derives path predictions between the specific end-hosts identified in the query. For the predicted path between the specific end-hosts, the query interface node predicts metrics such as latency, loss rate, bottleneck capacity, and available bandwidth, which are based on the data previously collected by the server in data storage 26.

Internet Atlas

The atlas that is generated by this exemplary embodiment is both extensive and detailed—it comprises the topology of the Internet core and the core's connectivity to representative targets in the edge networks, complete with a rich set of static attributes (such as link delay and link capacity), and recent observations of dynamic properties (such as routes between network elements, path loss rates, and path congestion). The iPlane system uses systematic active measurements to determine the attributes of the core routers and the links connecting them. In addition, the system performs opportunistic measurements by monitoring actual data transfers to and/or from end-hosts participating in BitTorrent swarms, thereby exposing characteristics of the edge of the network that typically cannot be obtained from one-way probing, e.g., the capacities of access links.

Figure 11:
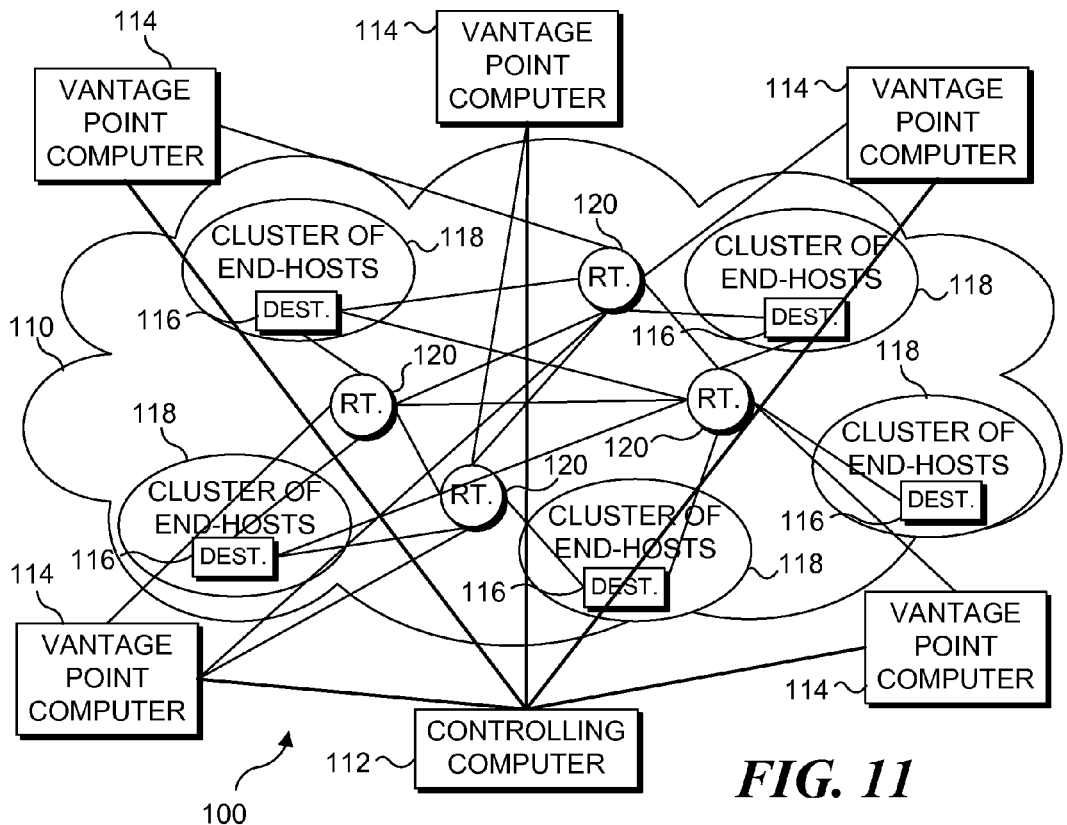
FIG. 11 is an exemplary schematic diagram that illustrates how the vantage points, routers, clusters, and destinations within each cluster are inter-related on the Internet, in connection with implementing the iPlane system.

FIG. 11 illustrates a portion 100 of a network 110 such as the Internet, showing how the iPlane system is configured to collect data that define the structure and routing configuration layers of the network. Since it is impractical to probe every Internet end-host to generate the atlas, this exemplary approach probes cluster end-hosts on the basis of BGP atoms. In this exemplary approach, clusters 118 of end-hosts on network 110 are identified using this approach. Each cluster 118 includes at least one destination 116, which is a computing device included in the cluster that is designated to represent the cluster. Performance metrics measured relative to the destination in a cluster are assumed to be representative of the performance metrics that would be measured for any end-host in the cluster.

A controlling computer 112 is in communication with a plurality of geographically dispersed vantage points 114, which in this exemplary embodiment, each comprise a computing device available to the controlling computer and are included in the PlanetLab™ distributed computing system. Routers 120 connect the vantage points to the destinations in different clusters.

A client's end-host performance is approximated by a representative target (i.e., the destination) in the same atom or cluster as the client. While this step is generally not considered part of the present exemplary approach and is clearly not necessary, if a client desires greater prediction accuracy, it can voluntarily perform one or more probes and contribute the paths that it discovers, to the data store of the iPlane system. Multi-homed clients can benefit from the additional information provided by such an operational model. It must be emphasized, however, that unlike conventional techniques for determining performance metrics, the present novel approach does NOT rely on directly measuring or probing the performance metrics of an actual network communication path coupling an end-host, A, with some other end-host, B, on the network, where the measurement is carried out by one of these two end-hosts. Thus, the present novel approach does not require that the performance metrics of a path between two end-hosts be directly measured by either end-host. Instead, the performance metrics between any two arbitrary end-hosts on the network can be predicted based upon data previously collected for a plurality of observed paths between vantage points and destinations in clusters, which are carried out by the iPlane system. Controlling computer 112 collects and stores the resulting data for subsequent use in predicting the performance metrics between any arbitrary pair of end-hosts on the network.

The iPlane system thus uses its collected repository of observed paths to predict end-to-end paths between any pair of end-hosts. This prediction is made by carefully composing partial segments of known Internet paths so as to exploit the similarity of Internet routes, i.e., routes from two nearby sources tend to converge when heading to the same destination. The iPlane system predicts a path by splicing a short path segment from the source to an intersection point from which a path going to the destination has been observed in the atlas. This step is repeated for additional short path segments as needed. To determine intersections between paths, interfaces that are owned by the same AS and reside in the same PoP are grouped; two paths are deemed to have intersected if they pass through the same group.

Once a path between end-hosts is predicted, the iPlane system simply employs the measured properties of the constituent path segments to predict the performance of the composite path. For instance, to make a latency prediction, the iPlane system automatically adds the latencies associated with the individual path segments. Or, to predict the end-to-end bandwidth, the iPlane system automatically determines the minimum of the bandwidth measured for each of the inter-cluster links along the predicted path, and the bandwidth of the client's access link, if available.

The following discussion explains the techniques that are used to develop the measurement data employed for predicting performance metrics between any two arbitrary end-hosts on the Internet. These techniques are summarized in Table 1, below.

Mapping the Internet Topology

The iPlane system requires geographically distributed vantage points to map the Internet topology and obtain a collection of observed paths. PlanetLab servers, located at over 300 sites around the world, serve as the primary vantage points. Also enlisted for low-intensity probing are public Looking Glass/Traceroute servers. Further, there is a potential option for using data from DIMES, which is a system for aggregating low intensity measurements from normal PCs. The primary tool for determining the Internet topology is the software program tool known as "traceroute," which enables identification of the network interfaces on the forward path, from the probing entity to the destination. (On PlanetLab, an optimized version of the tool, is used to reduce measurement load.) Determining the destinations to probe and how to automatically convert the raw output of traceroute to a structured topology is nontrivial and is addressed below.

TABLE 1

Summary of Techniques Used in iPlane

| Technique | Description | Goal |
| --- | --- | --- |
| generate probe targets | Obtain prefixes from Routeview ™'s BGP snapshot and cluster groups of prefixes with similar routes. | coverage, scalability |
| traceroutes from vantage points | PlanetLab ™ nodes probe all targets, while Traceroute/Looking Glass ™ servers issue probes to a small subset of the targets. | map topology, capture path diversity |
| cluster network interfaces | Identify network interfaces that are in the same AS and geographically colocated. | build structured topology, scalability |
| frontier algorithm | Schedule measurements of link attributes to PlanetLab ™ nodes such that each link is probed by the vantage point closest to it. | accuracy, balance load |
| measure link attributes | PlanetLab ™ nodes measure the loss rate, capacity, and available bandwidth over a subset of paths in the Internet core. | annotate topology |

TABLE 1-continued

Summary of Techniques Used in iPlane

| Technique | Description | Goal |
| --- | --- | --- |
| opportunistic measurements | Leverage existing applications to discover the structure and performance of edge networks. | minimize obtrusiveness, access link properties |
| route composition | Compose segments of observed or reported paths to predict end-to-end paths between a pair of nodes. | path prediction, performance prediction |

Probe Target Selection

BGP snapshots, such as those collected by Route-Views™, are a good source of probe targets. The iPlane system achieves wide coverage for the topology mapping process by obtaining a list of all globally routable pre-fixes in BGP snapshots, and choosing within each prefix a target ".1" address (i.e., an Internet address having the general form xxx.xxx.xxx.1) that responds to either ICMP or UDP probes. A .1 address is typically a router and is thus more likely to respond to probes than arbitrary end-hosts.

To reduce measurement load, the iPlane system clusters IP address prefixes into BGP atoms for generating the target list. A BGP atom is a set of IP address prefixes, each of which has the same AS path to it from any given vantage point. BGP atoms can be regarded as representing the knee of the curve with respect to measurement efficiency—probing within a BGP atom might find new routes, but it is less likely to do so. This task of determining a representative set of IP addresses is performed relatively infrequently, typically once every two weeks in the present exemplary embodiment.

The iPlane system uses the PlanetLab nodes to perform exhaustive and periodic probing of the representative targets. In addition, the iPlane system schedules probes from public traceroute servers to a small random set of BGP atoms, typically making a few tens of measurements during the course of a day. The public traceroute servers serve as a valuable source of information regarding local routing policies. Note that in the long run, functioning of the iPlane system may actually serve to decrease the load on the public traceroute servers, because the iPlane system, rather than the traceroute servers themselves, can be consulted for information on the Internet topology.

Grouping of Interfaces

Traceroute produces a list of network interfaces on the path from source to destination. However, interfaces on the same router, or in the same point of presence (PoP), may have similar behavior. The network interfaces are partitioned into groups, and this more compact topology is then used for more in-depth measurements and predictions. The groups are defined to include interfaces that are similar from a routing and performance perspective, i.e., interfaces belonging to the same PoP and interfaces within geographically nearby portions of the same AS. Note that this step of grouping is performed on network interfaces in the Internet core, whereas the clustering of prefixes into BGP atoms was performed for end-host IP addresses. In fact, clustering addresses in the same prefix will be ineffective in the core, because geographically distant interfaces are often assigned addresses in the same IP address prefix.

The iPlane system first identifies interfaces that belong to the same router. Interfaces that are potential alias candidates are identified using two different techniques. Employing the Mercator technique, UDP probes are sent to a high-numbered port on every router interface observed in the traceroutes. Interfaces that return responses with the same source address are considered as possible aliases. In addition, candidate alias pairs are also identified using the fact that interfaces on either end of a long-distance link are usually in the same /30 prefix (where "/30" indicates the first 30 bits of the IP addresses). Candidate pairs that respond with similar IP-ID values to the UDP probes, and also respond with similar TTLs to the ICMP probes are considered to be aliases. In one typical run using the iPlane system, of the 396,322 alias candidate pairs yielded by the Mercator technique, 340,580 pairs were determined to be aliases. The 918,619 additional alias candidate pairs obtained using the /30 heuristic approach yielded another 320,150 alias pairs.

In addition, the iPlane system determines the domain name system (DNS) names assigned to as many network interfaces as possible. It then uses two sources of information— Rocketfuel™'s "undns" utility program and data from the Sarangworld project—to determine the locations of these interfaces based on their DNS names. This step alone does not suffice for the purpose of clustering geographically co-located interfaces because: (1) certain interfaces do not have a DNS name assigned to them; (2) rules for inferring the locations of all DNS names do not exist; and, (3) incorrect locations are inferred for interfaces that have been misnamed. For IPs whose locations can be inferred from DNS names, the locations are validated by determining if they are consistent with the measured delays from traceroutes.

To cluster interfaces for which a valid location was not determined, an automated algorithm was developed that clusters interfaces based on responses received from them when probed from a large number of vantage points. All interfaces are probed from all of the iPlane system's PlanetLab vantage points using ICMP ECHO probes. The TTL value in the response is used to automatically estimate the number of hops on the reverse path back from every router to each of the vantage points. This step is based on the hypothesis that routers in the same AS, which are geographically nearby, will have almost identical routing table entries and therefore take similar reverse paths back to each vantage point.

To translate this hypothesis into a clustering algorithm, each interface is associated with a reverse path length vector. This vector has as many components as the number of vantage points, and the $i^{th}$ component is the length of the reverse path from the interface back to the $i^{th}$ vantage point. The cluster distance between two vectors is then defined to be the L1 distance—i.e., the sum of the absolute differences between corresponding components, divided by the number of components. In these measurements, it has been observed that the cluster distance between reverse path length vectors of co-located routers in an AS is normally less than 1.

Based on the metric discussed above, a technique can now be explained for assigning interfaces without known locations to clusters. This technique starts by initializing clusters to contain those interfaces for which a location has been determined. Interfaces that have been determined to be co-located in an AS are in the same cluster. For each cluster, the median reverse path length vector is computed (where the median reverse path length vector of $i^{th}$ component is the median of the $i^{th}$ components of the vectors corresponding to all interfaces in the cluster). All interfaces that do not belong to any cluster are then clustered as follows. For each interface, this step requires determining the cluster in the same AS, as the interface with whose median vector the interface's vector has the least cluster distance. If this minimum cluster distance is less than 1, the interface is added to the chosen cluster, otherwise, a new singleton cluster is created. This clustering process, when executed on a typical traceroute output, clusters 762,701 interfaces into 54,530 clusters. Also, 653,455 interfaces are in 10,713 clusters of size greater than 10, while 21,217 interfaces are in singleton clusters.

Measuring the Internet Core

After clustering, the iPlane system can operate on a compact routing topology, where each node in the topology is a cluster of interfaces and each link connects two clusters. The iPlane system then seeks to determine a variety of link attributes that can be used to predict path performance. To achieve this goal, a centralized agent (i.e., controlling computer 112 in the example of FIG. 11) is used to distribute the measurement tasks such that each vantage point is assigned to repeatedly measure only a subset of all the links to the destinations in the various clusters. The centralized agent uses the compact routing topology to determine the assignments of measurement tasks to vantage points, communicates the assignment, and monitors the execution of the tasks. Only the iPlane system infrastructure nodes (namely, PlanetLab nodes) are used as the vantage points for these tasks in this exemplary embodiment.

There are three objectives to be satisfied in assigning measurement tasks to vantage points. First, it is desirable to minimize the measurement load by measuring each link attribute from only a few vantage points (more than one vantage point is employed to correct for measurement noise). Second, the measurement should be load-balanced across all vantage points, i.e., each vantage point should perform a similar number of measurements. Third, in order to measure the properties of each link as accurately as possible, every link in the topology is measured from the vantage point that is closest to it.

A novel "frontier" algorithm has been developed to perform the assignment of tasks to vantage points. The algorithm works by growing a frontier rooted at each vantage point and having each vantage point measure only those links that are at its frontier. The centralized agent performs a Breadth-First-Search (BFS) over the measured topology in parallel from each of the vantage points. Whenever a vantage point is taken up for consideration, the algorithm automatically performs a single step of the BFS by following one of the traceroute paths originating at the vantage point. If it encounters a link whose measurement task has already been assigned to another vantage point, it continues the BFS exploration until it finds a new link that has not already been assigned. This process continues until all the link measurements have been assigned to some vantage point in the system.

The centralized agent uses the above algorithm to automatically determine the assignment of tasks and then ships the appropriate task list to the respective vantage points. Each target link is identified by the traceroute path that the vantage point can use to reach the link and by its position within the traceroute path. If a vantage point is no longer capable of routing to the link, for example, due to route changes, the vantage point reports this problem to the centralized agent, which in turn, automatically reassigns the task to a different vantage point.

Most link attributes, however, cannot be directly determined by the vantage points. For instance, when measuring loss rates, a vantage point can only measure the loss rate associated with the entire path from the vantage point to the target link; the loss rates of individual links comprising this path have to be inferred as a post-processing operation. Once all vantage points report their measurements back to the centralized agent, the agent can perform the BFS style exploration of the topology to infer link properties in the correct order. For instance, assume that a vantage point v had probed the path v, x, y and obtained a (one-way) loss rate measurement of $l_{v,y}$ for the entire path. The centralized agent can then infer the loss rate along the link (x, y) after inferring the loss rates for each of the links in v, . . . , x, composing these individual loss rates to compute the loss rate $l_{v,x}$ along the segment v x, and then calculating the loss rate for (x, y) using the equation $(1-l_{v,y})=(1-l_{v,x})\cdot(1-l_{x,y})$. Since the link property inference is performed as a BFS traversal, it can be guaranteed that loss rates for all the links along v, ,x have been inferred before considering the link (x, y).

In this exemplary current system, the centralized agent schedules and monitors roughly 2700K measurements per day, a management load that a single centralized agent can easily bear. Fault tolerance is an issue, but is addressed by a simple failover mechanism to a standby controller. Note that the processed data are served to applications from a replicated database to ensure high availability.

Measurement of Link Attributes

The following section outlines the details of the loss rate, bottleneck capacity, and available bandwidth measurements performed from each vantage point. Previous research efforts have proposed specific ways to measure each of these properties. A goal of the present approach is to integrate these techniques into a useful prediction system. Latencies of path segments can be derived directly from the traceroute data gathered while mapping the topology and therefore, do not need to be measured explicitly.

Loss Rate Measurements: Loss rate measurements are performed along path segments from vantage points to routers in the core by sending out probes and determining the fraction of probes for which responses are received. The present exemplary embodiment uses the simple method of sending TTL-limited singleton ICMP probes with a 1000-byte payload. When the probe's TTL value expires at the target router, it responds with an ICMP error message, typically with a small payload. When a response is not received, it is not possible to determine whether the probe or the response was lost, but there is some evidence from previous studies that small packets are more likely to be preserved, even when routers are congested. Therefore, all of the packet loss is attributed to the forward path.

Capacity Measurements: Capacity measurements are performed in this exemplary embodiment using known algorithms that vary the packet size and determine the delay induced by increased packet sizes. For each packet size, a number of probes (typically 30-40) of that size are sent to an intermediate router, and the minimum round-trip time is automatically noted. The minimum round-trip time observed over many probes can be regarded as a baseline path latency measurement with minimal queuing delays. By performing this experiment for different packet sizes, it is possible to automatically determine the increased transmission cost per byte. When this measurement is performed for a sequence of network links in succession, the capacity of each link can be determined. It should be noted that the capacity measurements may underestimate the capacity of a cluster link if it includes multiple parallel physical links.

Available Bandwidth Measurements: Once link capacities have been determined, the system can automatically probe for available bandwidth along path segments using packet dispersion techniques that are known in the art. A simple measurement is performed by sending a few, equally spaced, short probes at an expected bottleneck capacity of the path segment, and then measuring how much delay the probes induce. The slope of the delay increase will indicate how much background traffic arrived during the same time period as the probe. For instance, if the probes are generated with a gap of $\Delta_{in}$ through a path segment of capacity C, and if the measured gap between between the probe replies is $\Delta_{out}$, it is possible to automatically estimate the available bandwidth as $$C \cdot \left(1 - \frac{\Delta_{out} - \Delta_{in}}{\Delta_{in}}\right).$$

An important detail is that the packets have to be scheduled at the desired spacing, or else the measurement is not valid. Fortunately, even on heavily loaded PlanetLab nodes, it is possible to realize the desired scheduling most of the time.

Opportunistic Edge Measurements

To provide a comprehensive data set on which to automatically infer the current properties of paths leading to end-hosts, it is necessary for the iPlane system to maintain an up-to-date map of the network that extends to the very edge. However, the measurement techniques outlined above are unlikely to work in achieving that specific goal, since as is true of most other active measurements, that capability would require end-hosts to respond to unsolicited ICMP, UDP, or TCP packet probes. Also, measurements to end-hosts are frequently misinterpreted by intrusion detection systems as attacks. Hence, an opportunistic approach to data collection is employed instead—measuring paths to end-hosts while interacting with them over normal connections. The popular file-distribution application BitTorrent™ is used for this purpose and to gather measurements from exchanges with the peers in the BitTorrent swarming system. Note that BitTorrent has the further desirable property that anyone can connect to anyone, allowing measurements of multiple paths be arranged with participating edge end-hosts.

BitTorrent is used daily by thousands of end users to distribute large files and is one example of a large class of swarming data distribution tools. By participating in several BitTorrent swarms, there is an opportunity to interact with a large pool of end-hosts. Properties of the paths to peers can be automatically measured while exchanging data with them as part of the swarming system.

Currently, two other kinds of measurements are gathered using the opportunistic measurement infrastructure. These measurements are:

Packet traces of TCP flows to end-hosts. These traces provide information about packet inter-arrival times, loss rates, TCP retransmissions and round trip times. The inter-arrival times between data packets to measure bottleneck bandwidth capacities of paths from clients to vantage points, as described further below.

Traceroutes to end-hosts. When a peer connects to a measurement node in the iPlane system, a traceroute to that host is automatically initiated and the data are recorded and added to the atlas for the system.

Performance Prediction

The following section discusses path properties between an arbitrary pair of nodes that are predicted based on the above measurements. The prediction proceeds in two steps. First, the forward and reverse paths connecting the two nodes are predicted. Second, measured link-level properties are aggregated to predict end-to-end path properties.

Path Prediction. FIG. 1 illustrates a simple example showing how a path can be predicted between a source, S, and a destination, D. A previously developed technique based on composing observed path segments is used to predict unknown paths. If S is a vantage point, then the actual path from S to D is simply returned for the prediction as the path that will be used. Otherwise, an appropriate intersection point I in the measured sub-graph of the Internet is returned, such that the following conditions are met: (a) the AS hop count of the path S.I.D is minimum; and, (b) the latency from S to the point where the path S.I.D exits the first-hop AS is a minimum, in that order (as shown in FIG. 1). The underlying principle is "similarity of routes," i.e., with a sufficiently large number of vantage points, the path to a destination (D) from any node (S) will be similar to the path from a vantage point or router (I) that is located nearby. Condition (a) encodes the default path selection criterion used by BGP in the absence of conflicting local preference policies. Condition (b) encodes the default early exit intra-domain routing policy. Note that the above technique is guaranteed to return a path (albeit an inflated one), since every path of the form S.V.D, for each vantage point V, belongs to the measured subgraph.

As noted above, measurements to BGP atoms are made rather than measurements to all possible destinations. Adding a small number of measured paths originating from a source client S significantly improves the prediction accuracy for paths sourced at S. Using these measurements, the path from S to D is S to I to D's atom to D. If there is a measurement of the last hop from D's atom to D, it is used; otherwise, it is estimated using a representative node in the atom (e.g., from BitTorrent measurements). Briefly summarizing the main results, the AS path can be predicted accurately for about 70% of the paths evaluated, and the latency estimates obtained using this model are significantly better than those yielded by a conventional popular network co-ordinate system.

Path Properties. Given predicted paths determined as discussed above, it is possible to estimate end-to-end properties by aggregating link-level properties. For example, the TCP transfer time can be predicted using widely accepted known models. For this step, the forward and reverse paths between the source and the destination are predicted. The latency on the forward path S.I.D-atom D is estimated as the sum of the latency estimates for each segment. Similarly, the latency along the reverse path is estimated, and then, the RTT between the two end-hosts is computed to be the sum of the latency estimates along the forward and reverse paths. The loss rate on the predicted forward path is estimated from the probability of a loss on any of its constituent links, while bandwidth is the minimum value across the links. The access link capacities of these end-hosts, if available based on Bit- Torrent™ measurements to hosts in the same /24 IP address prefixes, are also used to estimate the end-to-end bottleneck bandwidth.

Recently, it has been argued that the best way to accurately predict TCP throughput is to send TCP flows and use history-based predictors. Although this approach has not been implemented in the present exemplary embodiment, the optional use of passive BitTorrent logs in the embodiment is amenable to incorporating such predictors.

Securing the iPlane System

The exemplary iPlane system allows untrusted users to contribute measurements, so it is vulnerable to attacks aimed at degrading its information. For instance, a client can claim to have better connectivity than is actually true, in order to improve its position within an overlay service that uses the iPlane system. The iPlane system reduces this risk by using client data only for those queries issued by the same client; falsified measurements will thus not affect the queries issued by other clients.

However, the iPlane system trusts traceroute servers to provide unbiased data, although the traceroute servers are not under the control of the system. An ISP hosting a traceroute server might bias its replies from the server to better position its clients, for example, to attract more BitTorrent™ traffic and thereby generate more revenue. Verification can be employed to address this problem, i.e., by comparing the results from multiple vantage points for consistency, but this step has not yet been implemented.

Query Interface

The query interface exported by the iPlane system must be carefully designed to enable a diverse range of applications. The present exemplary implementation of the query interface exposes a database-like view of path properties between every pair of end-hosts in the Internet. For every source-destination pair, there exists a row in the view with the iPlane system's predicted path between these hosts and the predicted latency, loss rate, and available bandwidth along this path. In the present exemplary embodiment, any query to the iPlane system involves an SQL-like query on this view—selecting some rows and columns, joining the view with itself, sorting rows based on values in certain columns, and so on. The database view is merely an abstraction. The iPlane system does not a priori compute the entire table comprising predictions for every source-destination pair on the network; instead, it derives necessary table entries only on-demand, so that the results only appear to be returned by querying a database with existing entries for all such pairs.

For example, a content delivery network (CDN) can determine the closest replica to a given client by selecting those rows that predict the performance between the client and any of the CDN's replicas. A suitable replica can then be determined by sorting these rows based on a desired performance metric. To choose a good detour node for two end-hosts to use when conducting VoIP communication, the rows predicting performance from the given source can be joined with the set of rows predicting performance for the given destination. A good detour is one that occurs as the destination in the first view and as the source in the second view, such that the composed performance metrics from these rows are the best. These queries can be invoked in any one of the following ways.

Download the Internet Map: A library can be implemented that provides an interface to download the current snapshot of the entire annotated Internet map or a geographic region, to enable processing of the annotated map, and to export the above SQL-like view. An application simply links against and invokes the library locally.

On-the-fly Queries: Where it is undesirable for an application to incur the costs of downloading the annotated map and keeping it up-to-date, the application can query a remote iPlane system service node using non-local remote procedure calls (RPCs). Note that clients of CDNs, such as Akamai™ and Coral™, typically tolerate some indirection overhead in determining the nearest replica. To support such applications, the iPlane system downloads the annotated map of the Internet to every PlanetLab site, and then provides an RPC interface to the data. Further, because some applications might need to make multiple back-to-back queries to process the iPlane system's measurements, the application can be assisted in lowering its overheads by allowing it to upload a script that can make multiple local invocations of the iPlane system's library. The current implementation requires that this script be written in Ruby script language, since Ruby scripts can be executed in a sandboxed environment and with bounded resources. The output of the script's execution is returned as the response to the RPC. The iPlane system also exports an extended markup language-remote procedure call (XML-RPC) interface. Queries can be made to this interface by providing an XML document that contains an array of (source, destination) pairs. The response to each query comprises iPlane's predictions for the path and the path performance metrics between the (source, destination) pairs provided as input to the query.

Network Newspaper: Apart from downloading the Internet graph and issuing on-the-fly queries, a third model that can be supported is a publish-subscribe interface that enables users to register for information updates about specific portions of the Internet graph. This interface can enable users to subscribe to their "view" of the Internet, i.e., all paths originating from a specific user to all BGP atoms, or to insert triggers to be notified of specific events, e.g., when a critical link fails.

System Setup and Evaluation

The following section discusses results from a typical run of the iPlane system mapping process. Traceroutes are performed from PlanetLab nodes in more than 160 distinct sites in an initial exemplary embodiment. The targets for the traceroutes were .1 addresses in each of 91,498 IP address prefixes determined from the RouteViews BGP snapshot, although measuring paths to one IP address in each BGP atom should suffice. All interfaces observed in the measured topology were probed with UDP and ICMP probes, and the interfaces were clustered based on their responses.

Once a map of the Internet's core was gathered, the "frontier" BFS algorithm was employed to automatically determine paths to be probed from each of the 385 PlanetLab nodes present at the more than 160 sites used. For link metrics, multiple nodes per site were employed. To determine the properties of 270,314 inter-cluster links seen in the measured topology, each vantage point was assigned to measure only about 700 paths. Loss rate, capacity, and available bandwidth were measured for each of the assigned paths. These measurements were then processed to determine properties for every cluster-level link in the measured topology.

Figure 3A:
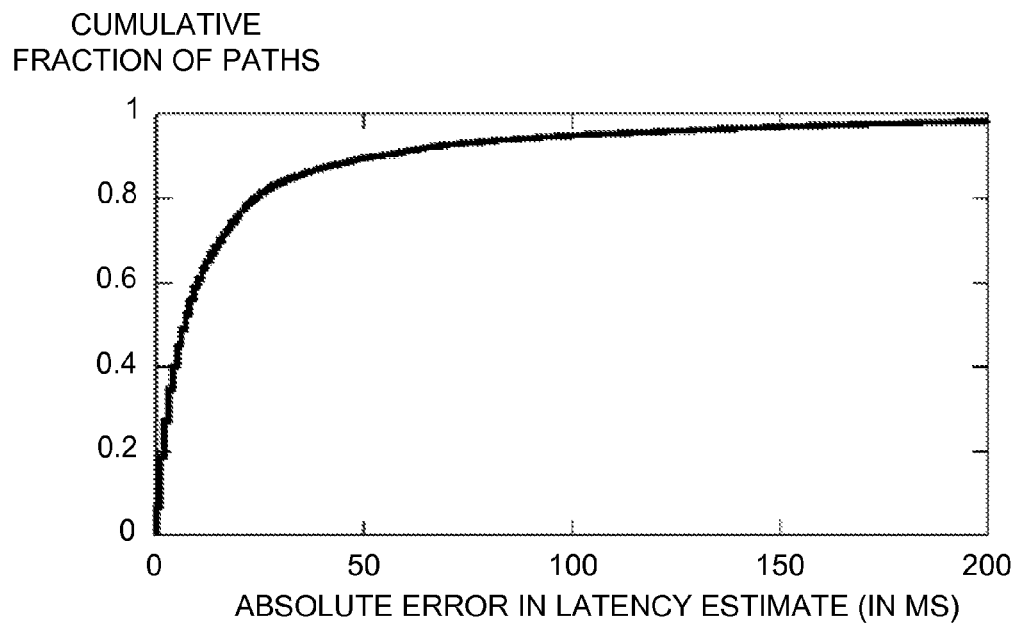
FIGS. 3A and 3B are graphs respectively illustrating an exemplary absolute error in latency estimate (in ms), and an exemplary absolute error in loss rate estimate, both relative to a cumulative fraction of paths in the network.
Figure 3B:
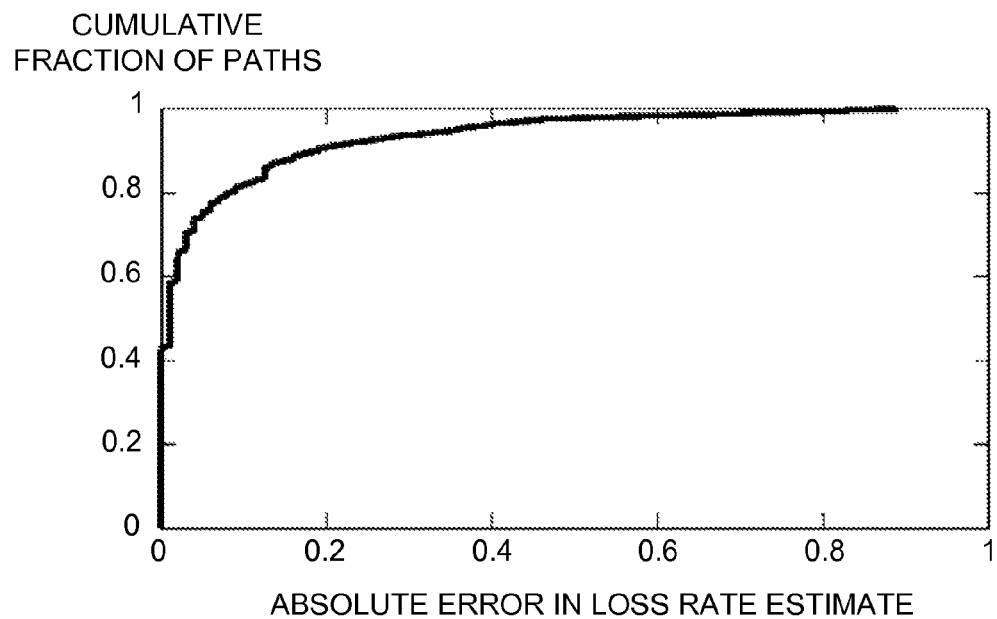

To validate the predictive accuracy of the iPlane system, properties of paths between PlanetLab nodes were compared with the corresponding values predicted by the iPlane system. The latency and loss rate were measured along every path between any two PlanetLab nodes. To predict the performance, it was assumed that the probe information collected by the other 161 sites was available, excluding the source and destination under consideration. Then, 10 traceroutes from the source and destination to random nodes were added to simulate the behavior of participating clients. Each experiment was performed independently to ensure no mixing of the measurement and validation set. FIGS. 3A and 3B compares the latency and loss rate estimates made by the iPlane system with the true values. For 77% of paths, the iPlane system's latency estimates have error less than 20 ms, and for 82% of paths, loss rate estimates have error less than 10%.

Figure 4:
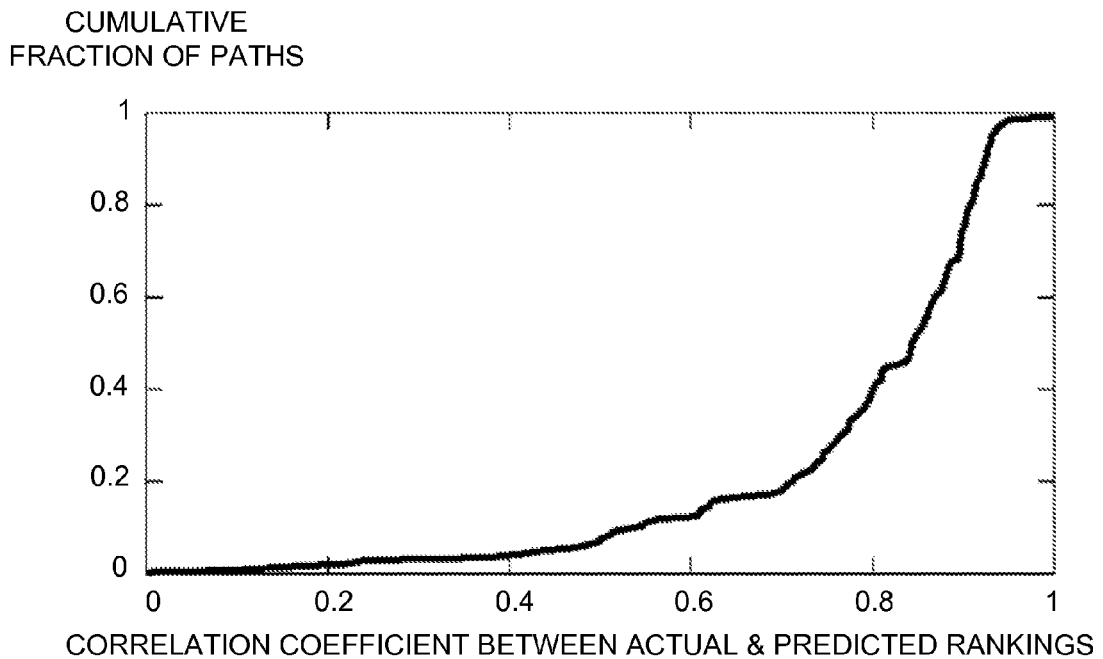
FIG. 4 is a graph illustrating an exemplary rank correlation coefficient between actual and predicted rankings relative to a cumulative fraction of paths.

Further, the accuracy in predicting path performance using the iPlane system's estimates of latency and loss rate in combination was evaluated. The desired property of these estimates is that they help distinguish between paths with good and poor performance. The order of paths from each Planet-Lab node were compared in terms of actual and predicted performance. For each node, all other nodes were ranked in terms of TCP throughput, considering throughput to be inversely proportional to latency and the square root of loss rate. These rankings were computed independently using measured path properties and using the iPlane system's predictions for these properties. FIG. 4 plots the correlation coefficient between the actual and the iPlane system predicted rankings across all PlanetLab nodes. For 80% of the nodes, the correlation coefficient is greater than 0.7.

Scalability

The following section discusses the measurement load required to generate and maintain a frequently refreshed map of the Internet. The measurement tasks performed by the iPlane system have two primary objectives—mapping of the Internet's cluster-level topology and determination of the properties of each link in the measured topology. Measurement of link properties incurs higher measurement overhead when compared to the probe traffic needed to perform a traceroute, but scales better. With more vantage points, the topology discovery traffic per node remains the same, but the overhead per node for measuring link metrics scales down, providing the same fidelity for less over-head per node. The measurement load associated with each technique in the iPlane system measurement is summarized below in Table 2. In this Table, the complexity of measurements techniques used in iPlane is based on the following assumptions: a UDP/ICMP probe is 40 bytes; a traceroute incurs a total of 500 B on average; the per-link loss rate, available bandwidth, and capacity measurements require 200 KB, 100 KB, and 200 KB of probe traffic respectively; and there are 400 PlanetLab nodes at 200 sites. The main result is that the iPlane system can produce an updated map of the Internet's routing topology every day with as little as 10 Kbps of probe traffic per vantage point, and update the map of link-level attributes once every six hours with around 100 Kbps of probe traffic per vantage point, suggesting that the iPlane system can refresh the Internet map frequently without causing an undue data flow burden.

TABLE 2

Complexity & Frequency of Measurement Techniques

| Measurement Task | Tool/Technique | Frequency | Probing rate/node |
|---|---|---|---|
| Topology Mapping | traceroute | Once a day | 200 vantage points × 50K atoms – 2.5 Kbps |
| Clustering | UDP probes for source-address-based alias resolution, ICMP-ECHO probes for RTTs and reverse TTLs | One day every week | 100 vantage points × 800K interfaces – 6 Kbps |
| Capacity measurements | "frontier" algorithm applied to cluster-level topology for path assignment, pathchar for bandwidth capacity | Once a day | 400 vantage points × 700 links – 13 Kbps |
| Loss rate & available bandwidth measurements | "frontier" algorithm for path assignment, TTL-limited probes for loss rate, spruce for available bandwidth | Continuous (every 6 hours) | 400 vantage points × 700 links – 80 Kbps |

Stationarity of Measurements

The iPlane system's measurements change over time with changes in the routes in the Internet and the traffic those routes carry. Again, PlanetLab data were used to estimate whether it is sufficient for the iPlane system to update its map every six hours. The stationarity of path properties for non-PlanetLab destinations can be evaluated as well.

Over a period of two days, the latency and loss rate between PlanetLab nodes were measured once every 30 minutes. For this study, a dataset of 174 Planet-Lab sites spanning 29 countries was used. In every interval, for each node, the ranking of all other nodes was computed in terms of TCP throughput. To evaluate the flux in path properties over a 30 minute timescale, these rankings were compared, between adjacent 30 minute intervals. For each PlanetLab node, the correlation coefficient between the ranking vectors from adjacent intervals was computed, as well as the intersection between the top 10 nodes in these ranking vectors. To compare this result with the flux in measurements over longer timescales, these computations were also performed at successive intervals of: one hour, two hours, four hours, eight hours, 16 hours, and 24 hours.

Figure 5A:
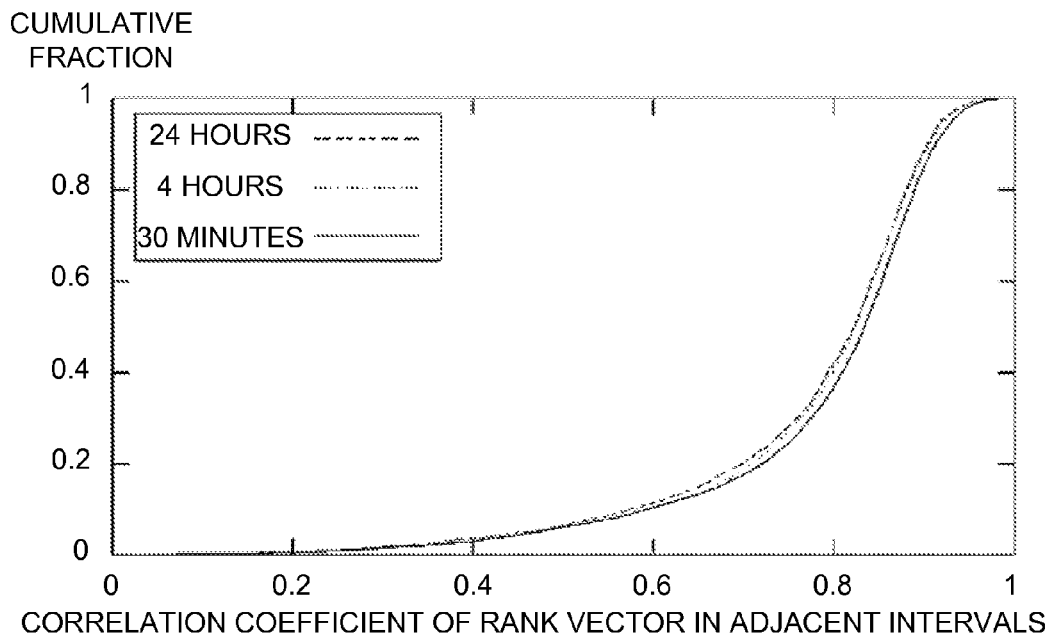
FIGS. 5A and 5B are graphs respectively illustrating exemplary correlation coefficients of rank vector in adjacent intervals, and an exemplary intersection between the best 10 peers in adjacent intervals, for periods of 30 minutes, 4 hours, and 24 hours, both relative to a cumulative fraction.
Figure 5B:
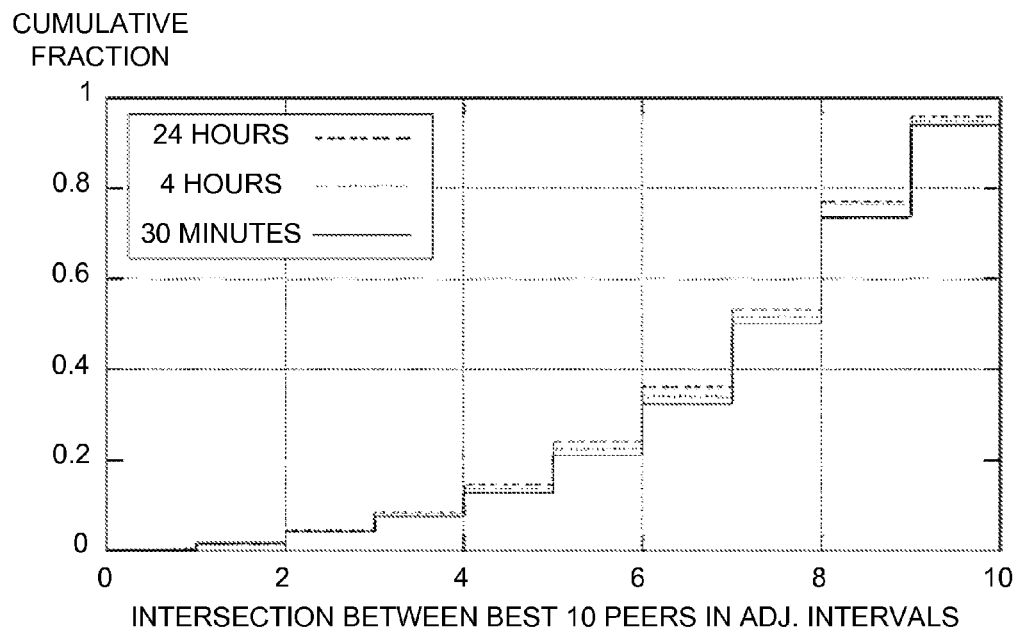

FIG. 5A shows that the median correlation coefficient between the rankings is greater than 0.8 across all intervals from 30 minutes to a day. Similarly, FIG. 5B shows that in the median case, seven of the top 10 nodes in this ranking are identical on timescales from 30 minutes to a day. Although these results are only for paths between PlanetLab nodes, they seem to indicate that there is little value in updating the map more frequently than once every few hours, compared to once every 30 minutes.

Measurements to End-Hosts

To measure the edges of the Internet, a modified BitTorrent™ client was deployed on 367 PlanetLab nodes. As described above, the infrastructure for measuring the edge involves the millions of users who frequently participate in the BitTorrent file sharing application. Every hour, for this exemplary embodiment, well-known public websites are crawled that provide links to several thousand .torrent files to put together a list of 120 popular swarms. The number of swarms for consideration was chosen so as to ensure the participation of several of the measurement vantage points in each swarm. The number of PlanetLab nodes designated to a swarm is proportional to the number of peers participating in it.

Each PlanetLab node runs a BitTorrent™ client that has been modified in several ways to aid in these measurements. First, the modified client does not upload any data nor does it write any data that it downloads onto disk. Second, the client severs connections once it has exchanged 1 MB of data, which suffices for purposes of these measurements. Finally, it employs a shadow tracker, i.e., a database that coordinates measurements among all PlanetLab nodes participating in a single swarm. Instead of operating only on the set of peers returned by the original tracker for the swarm, the modified client also makes use of the set of peers returned to any measurement node. Clients preferentially attempt to connect and download data from peers that have not yet been measured by a sufficient number of vantage points. These modifications are important for measurement efficiency and diversity, since typical BitTorrent trackers permit requesting only a restricted set (50-100) of participating peers once every 30 minutes or more. Such short lists are quickly exhausted by the modified client.

During a 48 hour period, the measurement nodes connected to 301,595 distinct IP addresses, and downloaded sufficient data to measure the upload bandwidth capacity from 70,428 of these hosts. These hosts span 3591 distinct ASs, 19,639 distinct BGP prefixes, and 160 different countries.

Validation of BitTorrent Capacity Measurements

The edge bandwidth capacity measurement relies on inter-arrival times observed between data packets in the connections maintained with BitTorrent peers. The multiQ technique was implemented to infer end-to-end bottleneck bandwidth capacity from these inter-arrival times. Although the accuracy of multiQ presented in previous studies is encouraging, the unique properties of PlanetLab motivated providing further validation. To verify that multiQ yields reasonable data with short TCP traces in the presence of cross traffic on machines under heavy load, the measurements that were made with the iPlane system were compared with those made by $S^3$, which is a system that measures the properties of paths between every pair of PlanetLab nodes every four hours.

Figure 6:
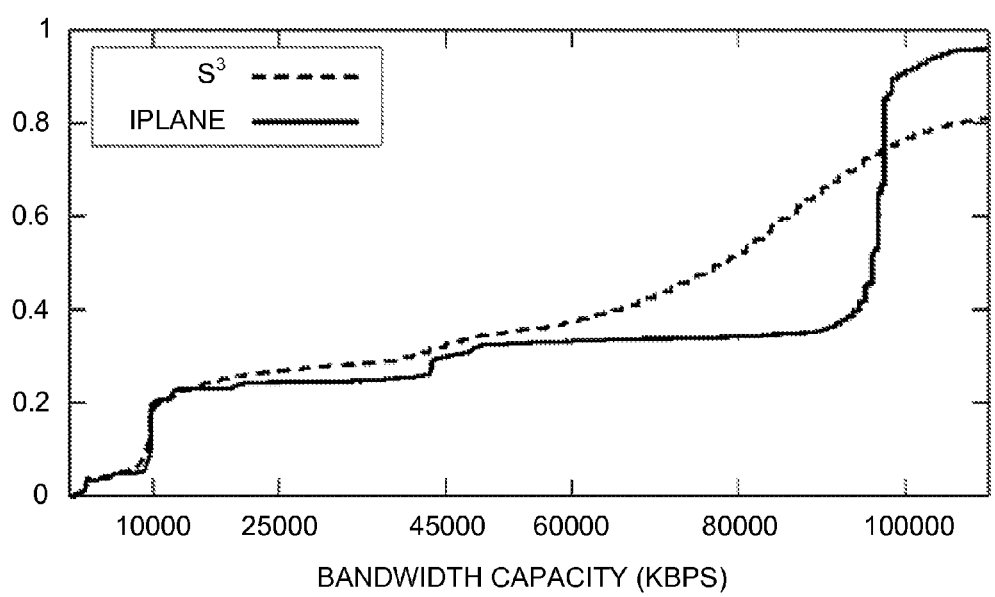
FIG. 6 is a graph illustrating exemplary CDFs of estimated bandwidth capacity on paths between PlanetLab nodes, comparing measurements by the iPlane system and $S^3$.

A test torrent was setup, and measurement clients were run on 357 PlanetLab nodes that were participating in this torrent. From this setup, the bottleneck bandwidth capacities were opportunistically measured between the PlanetLab nodes. The dataset gathered from this experiment had 10,879 paths in common with measurements made by $S^3$ on the same day. FIG. 6 compares the bandwidth capacities measured by the two methods. The measurements made by the iPlane system closely match those of $S^3$ for capacities less than 10 Mbps. At higher bandwidth capacities, they are only roughly correlated. This difference is attributed to the use of user-level timestamps by $S^3$. As inter-packet spacing can be rather small for high capacity paths, user-level timestamps are likely to be inaccurate in the highly loaded PlanetLab environment. The measurement setup makes use of kernel-level timestamps and is therefore less sensitive to high CPU load. For typical access link bandwidths, the two tools produce similar data; the value of using BitTorrent is that it works with unmodified clients that are behind firewalls or network address translations (NATs) that would drop active measurement probes. The more discernible steps in the iPlane system line in FIG. 6 are at 10 Mbps, 45 Mbps (T3), and 100 Mbps, which correspond to typical ISP bandwidth classes.

Clustering of End-Hosts

Figure 7:
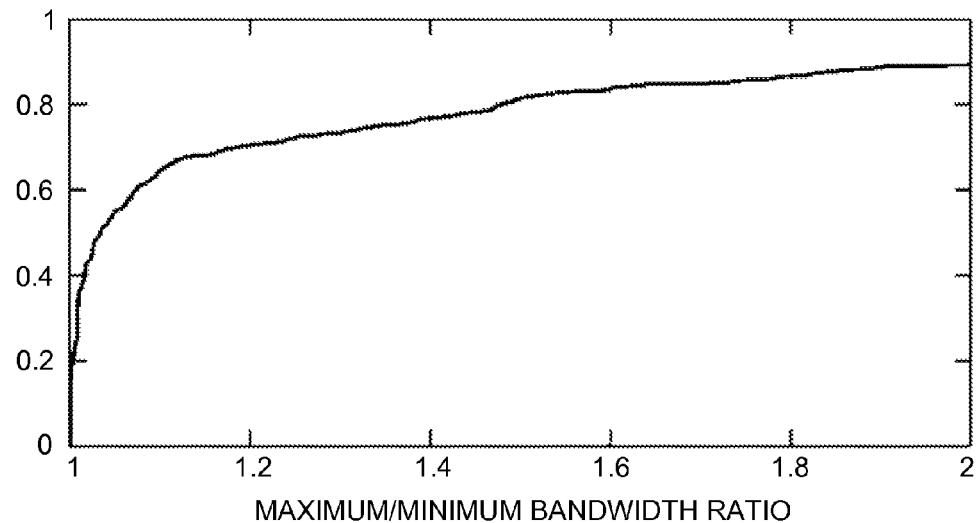
FIG. 7 is a graph illustrating an exemplary CDF of the ration of maximum/minimum bandwidth capacity for /24 IP address prefixes with multiple measurements from the same vantage point across time (where "/24" indicates the first 24 bits of the IP address)

Although the data produced by the opportunistic strategy is extensive, it is by no means complete. Not every client participates in popular torrents. In FIG. 7, the validity of using BitTorrent measurements to predict the performance of other clients in the same prefix is explored. For every /24 IP address prefix in which measurements were made to multiple end-hosts from the same vantage point, the ratio of the maximum to the minimum measured bandwidth capacity was computed. For 70% of /24 IP address prefixes, the capacities measured differ by less than 20%.

Application Case Studies

Content Distribution Network

Content distribution networks (CDNs) such as Akamai™, CoDeeN™ and Coral™ redirect clients to a nearby replica. The underlying assumption is that distance determines network performance. However, there is more to network performance than just distance, or round trip time. TCP throughput, for example, depends on both distance and loss rate. Even for small web documents, loss of a SYN or a packet during slow start can markedly inflate transfer time. A CDN using the iPlane system can track the RTT, loss rate, and bottleneck capacity from each replica to the rest of the Internet. The CDN can then arrange for its name servers to redirect the client to optimize using the model of its choice.

Figure 8:
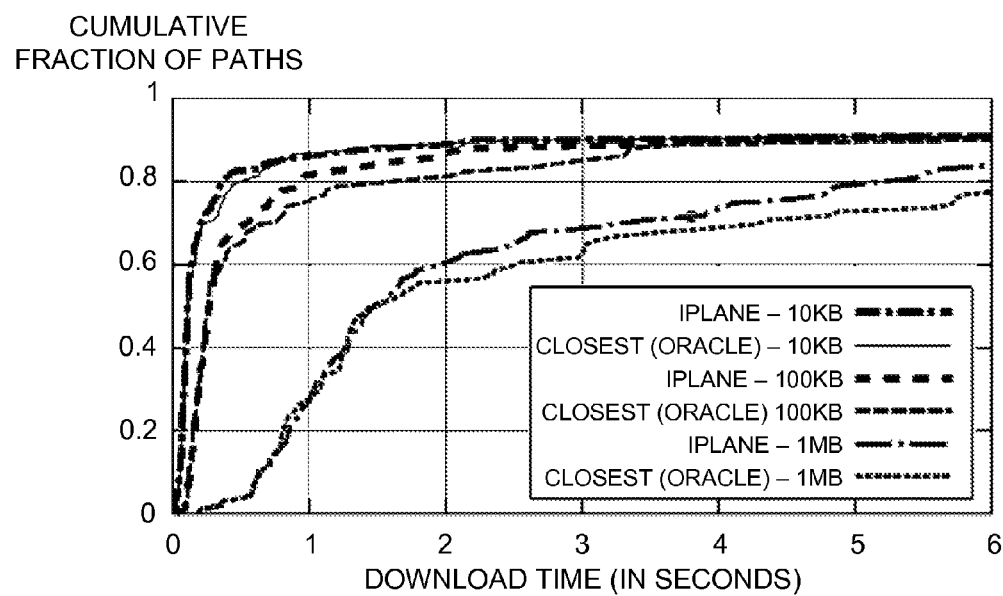
FIG. 8 is a graph illustrating an exemplary CDF of download times derived from replicas in the CDN chosen by the iPlane system and from replicas chosen in terms of latency, wherein each download time is the median of five measurements.

In one test, a small CDN comprising 30 randomly chosen PlanetLab nodes was emulated. Each node serves three files of sizes 10 KB, 100 KB, and 1 MB. In this test, 141 other Planet-Lab nodes were used to emulate clients. Each client downloaded all three files from the replica that provides the best TCP throughput as predicted by the PFTK model using the iPlane system's estimates of RTT and loss rate, and from the replica closest in terms of actual measured RTT. Note that this comparison is against an optimum that cannot be achieved without extensive probing. A real CDN will only have estimated RTTs available. FIG. 8 compares the download times experienced by the clients in either case, excluding the latency of redirecting to the replica. Choosing the replica for optimized TCP throughput based on the iPlane system's predictions provides slightly better performance than choosing the geographically closest replica. Although these results are not conclusive, they suggest that the iPlane system, with its ability to provide multi-attribute network performance data, will be more effective than systems such as OASIS™ that simply optimize for RTT.

BitTorrent System

This test shows how the iPlane system can enable informed peer selection in popular swarming systems like BitTorrent™. In current conventional implementations, a centralized BitTorrent tracker serves each client a random list of peers. Each client enforces a tit-for-tat bandwidth reciprocity mechanism that incents users to contribute more upload bandwidth to obtain faster downloads. However, the same mechanism also serves to optimize path selection at a local level—peers simply try uploading to many random peers and eventually settle on a set that maximizes their download rate. Because reasoning about peer quality occurs locally at each client, each client needs to keep a large pool of directly connected peers (60-100 for typical swarms) even though at any time only a few of these (10-20) are actively engaged in data transfer with the client. This overhead and consequent delayed convergence is fundamental. With only local information, peers cannot reason about the value of neighbors without actively exchanging data with them. The iPlane system's predictions can overcome the lack of prior information regarding peer performance and can thus enable a clean separation of the path selection policy from the incentive mechanism.

A modified tracker was built that uses the iPlane system for informed peer selection. Instead of returning random peers, the tracker uses the iPlane system's loss rate and latency estimates to infer TCP throughput. It then returns a set of peers, half of which have high predicted throughput and the rest of which were randomly selected. The random subset is included to prevent the overlay from becoming disconnected (e.g., where no U.S. node prefers a peer in Asia).

Figure 9:
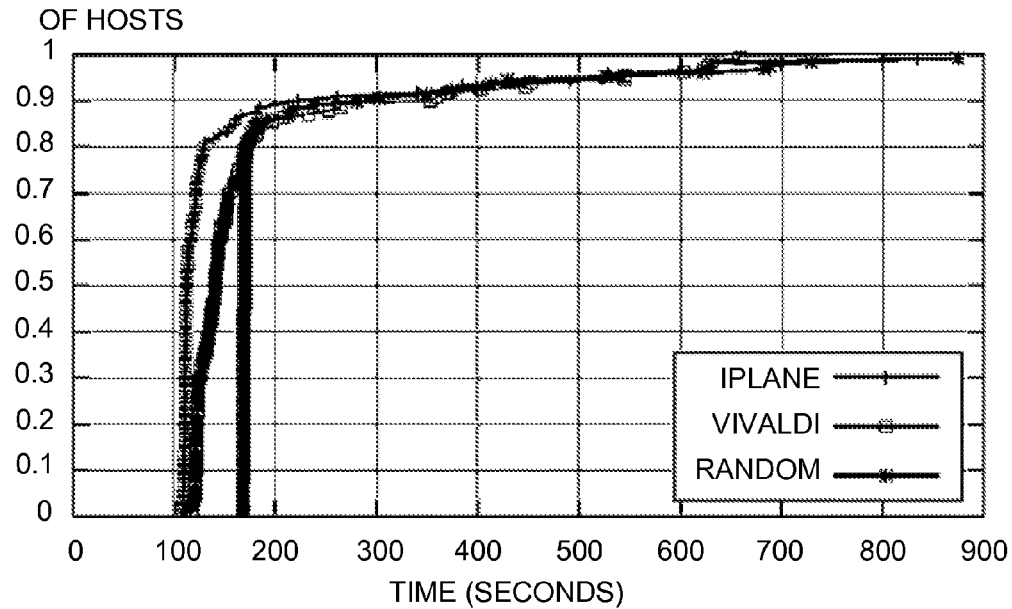
FIG. 9 is a graph illustrating exemplary CDFs of BitTorrent™ download completion times with and without informed peer selection at the tracker.

The modified tracker was used to coordinate the distribution of a 50 MB file over 150 PlanetLab nodes. The time taken by each of the peers to download the file after the seed was started was measured. FIG. 9 compares the download times observed with the iPlane system predictions against those of peerings induced by Vivaldi co-ordinates and an unmodified tracker. Informed peer selection causes roughly 50% of peers to have significantly lower download times.

Although preliminary, these performance numbers are encouraging. It is believed that better use of information from the iPlane system can lead to even further improvements in performance. The selection of 50% as the fraction of random peers was arbitrary, and further work may quantify the tradeoff between robustness and performance, as well as the degree to which these results extend to swarms with a more typical distribution of bandwidths.

Voice Over IP

Voice over IP (VoIP) is a rapidly growing application that requires paths with low latency, loss, and jitter for good performance. Several VoIP implementations such as Skype™ require relay nodes to connect end-hosts behind NATs/firewalls. Choosing the right relay node is crucial to providing acceptable user-perceived performance. Reducing end-to-end latency is important, since humans are sensitive to delays above a threshold. Low loss rates improve sound quality and reduce throughput consumed by compensating codecs. Measures of user-perceived sound quality, such as mean opinion score, have been shown to be highly correlated with loss rate and end-to-end delay. Thus, VoIP applications can benefit from the iPlane system's predictions of latency and loss rate in choosing the best possible relay node.

To evaluate the iPlane system's ability to successfully pick good relay nodes, VoIP traffic patterns were emulated on PlanetLab. In this evaluation, 384 pairs of PlanetLab nodes, chosen at random, were considered as being representative of end-hosts participating in a VoIP call. Between each pair, a call was emulated by sending a 10 KBps UDP packet stream via another PlanetLab node chosen as the relay node. Four different relay options were tried for each pair chosen based on: (i) the iPlane system's estimates of latency and loss rate; (ii) latency to the source; (iii) latency to the destination; and, (iv) random choice. The iPlane system-informed choice was obtained by first querying for the 10 relay options that minimize end-to-end loss and then choosing the one that minimized end-to-end delay among those options.

Figure 10A:
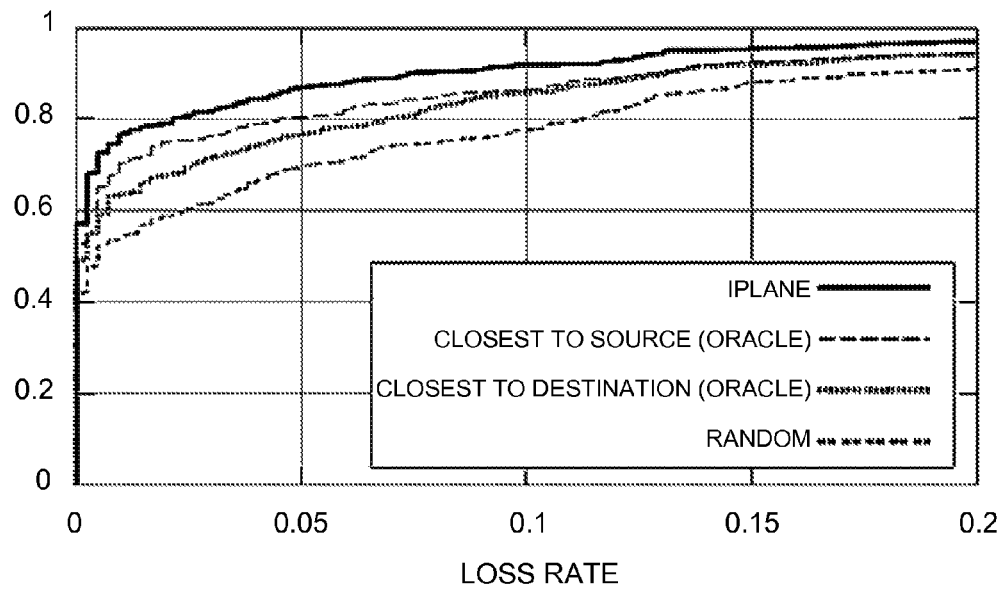
FIGS. 10A and 10B are graphs that respectively illustrate exemplary levels of jitter measured with and without the use of iPlane data, for end-to-end VoIP paths.
Figure 10B:
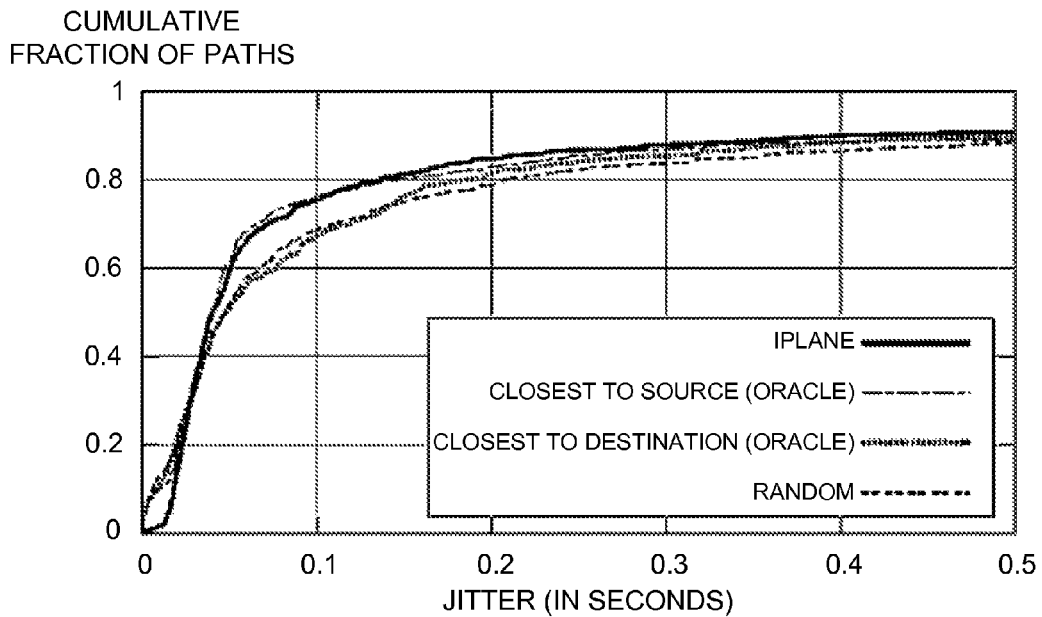

Each emulated call lasted for 60 seconds, and the end-to-end loss rate and latency were measured. FIG. 10A shows that significantly lower loss rates were observed along relay paths chosen based on the iPlane system's predictions. Additionally, FIG. 10B shows that the iPlane system also helps to reduce jitter, which was computed as the standard deviation of end-to-end latency. These results demonstrate the potential for the use of the iPlane system in VoIP applications.

Logical Steps Implemented by iPlane System

Figure 12:
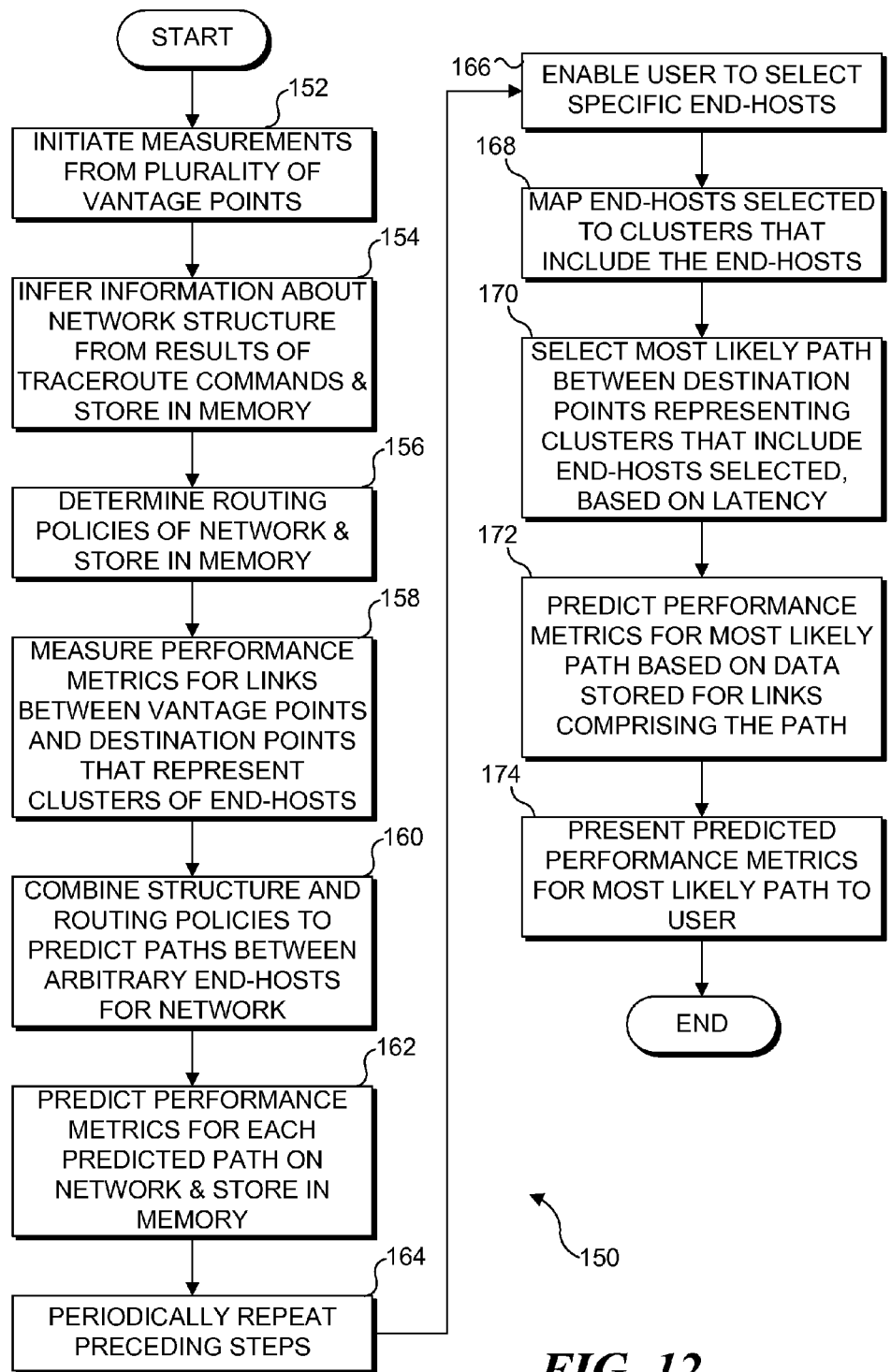
FIG. 12 is a flowchart illustrating exemplary steps carried out in determining predicted performance metrics using the present approach.

A flowchart 150 in FIG. 12 illustrates exemplary logical steps for carrying out the functions of the iPlane system. After starting, in a step 152, the central agent automatically initiates measurements from a plurality of vantage points that are distributed from geographically diverse locations around the network. Information about the network structure is inferred from the results of issuing traceroute commands from the vantages points in connection with the clusters that each vantage point is tasked with monitoring, in a step 154. A step 156 provides that the routing policies of the Internet are determined, for example, by querying any of the plurality of routers on the Internet. In a step 158, the vantage points then measure the performance metrics for links between the vantage points and destination points in different clusters, where the destination points are selected in a cluster to represent end-hosts in the cluster.

The structure and routing policies are combined in a step 160, to predict paths between arbitrary end-hosts on the network (i.e., on the Internet). A step 162 provides for predicting the performance metrics for a predicted path between selected end-hosts on the Internet on demand, in response to queries by clients or applications that are interested in the performance metrics for communication between the specific end-hosts requested. The preceding steps are periodically repeated to update the stored data for the Internet, as indicated in a step 164.

A step 166 enables a user or client application to select specific end-hosts, e.g., within a query submitted to the server or other central agent computer. The end-hosts that have been selected are mapped to clusters that include them, based upon their IP addresses, in a step 168. A step 170 selects the most likely path between destination points representing the clusters that include the end-hosts selected by the user or client application. The performance metrics for the most likely path that was just selected are then predicted, based on the data stored for the links comprising the most likely path, in a step 172. Finally, a step 174 provides for presenting the predicted performance metrics for the most likely path, to the user or client application that requested them. For a user, the performance metrics might be presented by displaying them on a display screen. Alternatively, the step of presenting the results might comprise the step of printing the results or of supplying them to the client application program to enable it to make a decision related to the specific end-hosts, based upon the results.

Exemplary Computing System for Implementing Novel Approach

Figure 13:
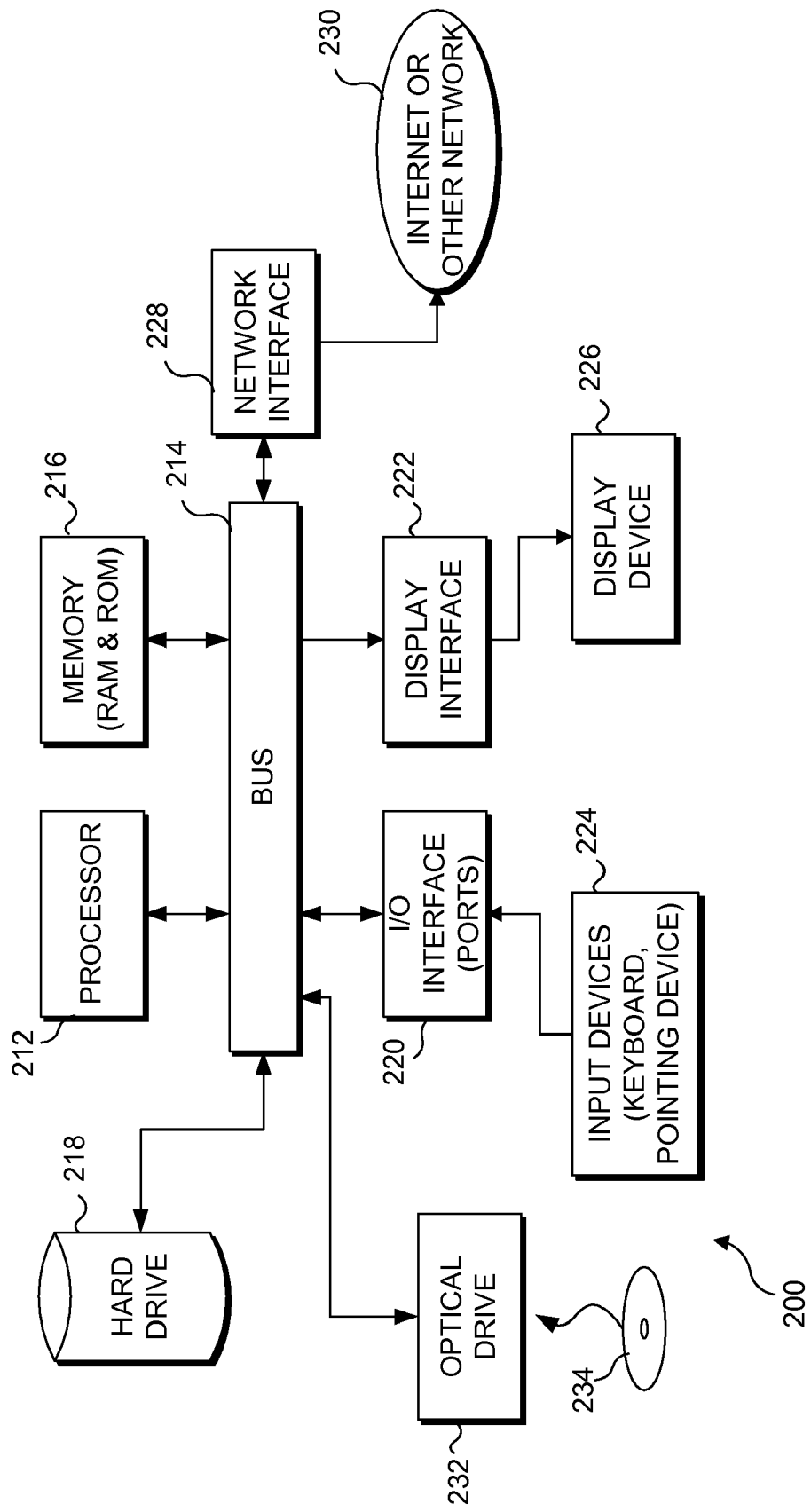
FIG. 13 is an exemplary conventional computing system that is useful for any of the vantage points, the controlling computer, and the destination points of the exemplary iPlane system.

FIG. 13 illustrates details of a functional block diagram for an exemplary computing device 200, which can be employed for any of the computing devices discussed above, including the centralized agent that controls the operation of the iPlane system, the vantage points, the destination points, and can also represent any of the arbitrary end-hosts on the Internet or other network on which the iPlane system is implemented. The computing device can be a typical personal computer, but can take other forms. For example, end-hosts can be implemented as smartphones, personal data assistants, gaming machines, and many other types of network-connected logical devices.

A processor 212 is employed in the exemplary computing device for executing machine instructions that are stored in a memory 216. The machine instructions may be transferred to memory 216 from a data store 218 over a generally conventional bus 214, or may be provided on some other form of memory media, such as a digital versatile disk (DVD), a compact disk read-only memory (CD-ROM), or other non-volatile memory device. An example of such a memory medium is illustrated by a CD-ROM 234. Processor 212, memory 216, and data store 218, which may be one or more hard drive disks or other non-volatile memory, are all connected in communication with each other via bus 214. The machine instructions are readable by the processor and executed by it to carry out the functions discussed above in regard to the exemplary embodiments. Also connected to the bus are a network interface 228 which couples to the Internet or other network 230, an input/output interface 220 (which may include one or more data ports such as a serial port, a universal serial bus (USB) port, a Firewire (IEEE 1394) port, a parallel port, a personal system/2 (PS/2) port, etc.), and a display interface or adaptor 222. Any one or more of a number of different input devices 224 such as a keyboard, mouse or other pointing device, trackball, touch screen input, etc., are connected to I/O interface 220. A monitor or other display device 226 is coupled to display interface 222, so that a user can view graphics and text produced by the computing system as a result of executing the machine instructions, both in regard to an operating system and any applications being executed by the computing system, enabling a user to interact with the system. An optical drive 232 is included for reading (and optionally writing to) CD-ROM 234, a DVD, or some other form of optical memory medium.

Benefit of this Novel Technology

The performance and robustness of overlay services critically depends on the choice of end-to-end paths used as overlay links. Today, overlay services face a tension between minimizing redundant probe overhead and selecting good overlay links. More importantly, overlay services lack an accurate method to infer path properties between an arbitrary pair of end-hosts. As explained above, it is possible to accurately infer sophisticated path properties between an arbitrary pair of nodes using a small number of vantage points and existing infrastructure. The key insight is to systematically exploit the Internet's structural properties. Based on this observation, the iPlane system described above has been shown to be useful for inferring a richly annotated link-level map of the Internet's routing topology once every few hours. The case studies described above suggest that the iPlane system can serve as a common information plane for a wide range of distributed services such as content distribution, file swarming, and VoIP.

Although the concepts disclosed herein have been described in connection with one or more exemplary embodiments for practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for automatically predicting performance metrics for communication between any two arbitrary end-hosts on a network in response to a query, comprising the steps of:

(a) initiating measurements of the network from a plurality of geographically distributed vantage points, each vantage point comprising a computing device that is coupled to the network;

(b) using traceroute data obtained for links between a plurality of destination points on the network and the plurality of vantage points, automatically inferring information defining a structure of the network;

(c) using the traceroute data, automatically determining routing policies applied by routers on the network during communication between the plurality of vantage points and the plurality of destination points;

(d) using a central computing device that is also coupled to the network, for coordinating the determination of the performance metrics for communications between the vantage points and selected destination points, the central computing device automatically determining the performance metrics for each link identified by the traceroute data;

(e) upon receiving a query that specifies a source and a destination of a communication link over the network, employing the information defining the structure, and the routing policies to predict a path between the source and the destination that were specified in the query; and (f) in response to the query, determining and returning the performance metrics for links between the source and the destination comprising the predicted path in the network, the step of determining the performance metrics further including the step of growing a frontier rooted at each vantage point, each vantage point measuring only links within the frontier rooted at the vantage point, the central computing device performing in parallel a breadth-first-search of traceroute paths originating at each vantage point, the central computing device assigning links to the vantage point found in the breadth-first-search that are not yet assigned to another vantage point, and the central computing device continuing the breadth-first-search and link assignment process until all link measurements have been assigned to a vantage point.

2. The method of claim 1, further comprising the step of automatically selecting a plurality of destination points so that each destination point of the plurality of destination points represents a cluster of end-hosts on the network, each cluster including end-hosts selected as a function of network addresses assigned to the end-hosts.

3. The method of claim 2, further comprising the step of accessing routing tables employed by routers on the network, to define the clusters of end-hosts represented by the plurality of destination points.

4. The method of claim 3, further comprising the steps of:

(a) enabling a user to select two arbitrary end-hosts on the network, in order to enable prediction of the performance metrics for communication between the two arbitrary end-hosts that were selected;

(b) identifying clusters that include the two arbitrary end-hosts that were selected;

(c) automatically selecting a most likely path between the destination points representing the clusters that were identified; and (d) using the performance metrics previously determined for the links comprising the most likely path to predict the performance metrics for communication between the two arbitrary end-hosts that were selected.

5. The method of claim 4, wherein the step of selecting the most likely path comprises the step of automatically selecting a path where a latency from a source to a point where the path from the source exits a first-hop autonomous system is a minimum.

6. The method of claim 1, further comprising the step of clustering the routers handling the links on the network by identifying routers that are at a common location and are operated by a common autonomous system.

7. The method of claim 1, further comprising the step of resolving aliases for routers on the network, to reduce the number of routers handling different links.

8. The method of claim 1, further comprising the step of predicting the performance metrics for each predicted path by implementing the steps of:
   (a) evaluating network latencies for each link of a predicted path connecting a vantage point to a destination point, for each vantage point and each destination point; and
   (b) storing the network latency for each link.

9. The method of claim 1, further comprising the step of predicting the performance metrics for each predicted path by implementing the steps of:
   (a) measuring a bandwidth of each link of the predicted path connecting a vantage point to a destination point, for each vantage point and each destination point; and
   (b) storing the bandwidth for each link.

10. The method of claim 1, further comprising the step of predicting the performance metrics for each predicted path by implementing the steps of:
    (a) measuring a packet loss rate of each link of the predicted path connecting a vantage point to a destination point, for each vantage point and each destination point; and
    (b) storing the packet loss rate of each link.

11. A system for automatically predicting performance metrics for communication between any two arbitrary end-hosts on a network in response to a query, comprising:
    (a) a memory in which machine instructions and data are stored;
    (b) a network interface for communicating over the network; and
    (c) a processor that is coupled to the memory and the network interface, the processor executing the machine instructions to carry out a plurality of functions, including:
        (i) initiating measurements of the network from a plurality of geographically distributed vantage points, each vantage point comprising a computing device that is coupled to the network, the processor communicating with the computing device at each vantage point over the network through the network interface;
        (ii) using traceroute data obtained over the network for links between a plurality of destination points on the network and the plurality of vantage points, automatically inferring information defining a structure of the network;
        (iii) using the traceroute data, automatically determining routing policies applied by routers on the network during communication between the plurality of vantage points and the plurality of destination points;
        (iv) automatically determining the performance metrics for each link identified by the traceroute data;
        (v) upon receiving a query that specifies a source and a destination of a communication link over the network, employing the information defining the structure, and the routing policies to predict a path between the source and the destination that were specified in the query; and
        (vi) in response to the query, determining and returning the performance metrics for the link between the source and the destination comprising the predicted path in the network, the processor automatically determining the performance metrics for each link identified by the traceroute by growing a frontier rooted at each vantage point, each vantage point measuring only links within the frontier rooted at the vantage point, and performing in parallel a breadth-first-search of traceroute paths originating at each vantage point, assigning links to the vantage point found in the breadth-first-search that are not yet assigned to another vantage point, and continuing the breadth-first-search and link assignment process until all link measurements have been assigned to a vantage point.

12. The system of claim 11, wherein the machine instructions executed by the processor further cause the processor to select a plurality of destination points so that each destination point represents a cluster of end-hosts on the network, each cluster including end-hosts selected as a function of network addresses assigned to the end-hosts.

13. The system of claim 12, wherein the machine instructions executed by the processor further cause the processor to access routing tables employed by the routers on the network to define the clusters of end-hosts represented by the plurality of destination points.

14. The system of claim 13, wherein the machine instructions executed by the processor further cause the processor to:
    (a) enable a user to select two arbitrary end-hosts on the network, to enable the performance metrics to be predicted for communication between the two arbitrary end-hosts that were selected;
    (b) identify clusters that include the two arbitrary end-hosts that were selected;
    (c) automatically select a most likely path between the destination points representing the clusters that were identified; and
    (d) use the performance metrics previously determined for the links comprising the most likely path to predict the performance metrics for communication between the two arbitrary end-hosts that were selected.

15. The system of claim 14, wherein the machine instructions executed by the processor further cause the processor to select the most likely path by automatically selecting a path where a latency from a source to a point where the path from the source exits a first-hop autonomous system is a minimum.

16. The system of claim 11, wherein the machine instructions executed by the processor further cause the processor to cluster the routers handling the links on the network by identifying routers that are at a common location and are operated by a common autonomous system.

17. The system of claim 11, wherein the machine instructions executed by the processor further cause the processor to resolve aliases for routers on the networks, to reduce the number of routers handling different links.

18. The system of claim 11, wherein the machine instructions executed by the processor cause the processor to predict the performance metrics for each predicted path by evaluating network latencies for each link of a predicted path connecting a vantage point to a destination point, for each vantage point and each destination point, and then store the network latency for each link in the memory.

19. The system of claim 11, wherein the machine instructions executed by the processor cause the processor to predict the performance metrics for each predicted path by measuring a bandwidth of each link of a predicted path connecting a vantage point to a destination point, for each vantage point and destination point, and then store the bandwidth for each link in the memory.

20. The system of claim 11, wherein the machine instructions executed by the processor cause the processor to predict the performance metrics for each predicted path by measuring a packet loss rate of each link of a predicted path connecting a vantage point to a destination point, for each vantage point and each destination point, and then store the packet loss rate of each link in the memory.

21. The system of claim 11, wherein each of the plurality of vantage points comprises a virtual machine that is running on a computing device and is accessible over the network.

22. A memory medium on which are stored machine readable and executable instructions, which when executed by a processor, cause the processor to carry out a plurality of functions used for automatically predicting performance metrics for communication between any two arbitrary end-hosts on a network in response to a query, the functions including:
   (a) initiating measurements of the network from a plurality of geographically distributed vantage points, each vantage point comprising a computing device that is coupled to the network;
   (b) using traceroute data obtained for links between a plurality of destination points on the network and the plurality of vantage points, automatically inferring information defining a structure of the network;
   (c) using the traceroute data, automatically determining routing policies applied by routers on the network during communication between the plurality of vantage points and the plurality of destination points;
   (d) at a central computing device that is executing the machine readable and executable instructions, coordinating the determination of the performance metrics for communications between the vantage points, to automatically determine the performance metrics for each link identified by the traceroute data;
   (e) upon receipt of a query that specifies a source and a destination of a communication link over the network, employing the information defining the structure, and the routing policies to predict a path between the source and the destination that were specified in the query; and
   (f) in response to the query, determining and returning the performance metrics for the link between the source and the destination comprising the predicted path in the network, wherein to determine the performance metrics, the machine instructions cause the central computing device to grow a frontier rooted at each vantage point, each vantage point measuring only links within the frontier rooted at the vantage point, the central computing device performing in parallel a breadth-first-search of traceroute paths originating at each vantage point, the central computing device assigning links to the vantage point found in the breadth-first-search that are not yet assigned to another vantage point, and the central computing device continuing the breadth-first-search and link assignment process until all link measurements have been assigned to a vantage point.

23. The memory medium of claim 22, wherein the machine readable and executable instructions, when executed by a processor, further cause the processor to automatically select a plurality of destination points so that each destination point of the plurality of destination points represents a cluster of end-hosts on the network, each cluster including end-hosts selected as a function of network addresses assigned to the end-hosts.

24. The memory medium of claim 23, wherein the machine readable and executable instructions, when executed by a processor, further cause the processor to access router tables employed by routers on the network, to define the clusters of end-hosts represented by the plurality of destination points.

25. The memory medium of claim 24, wherein the machine readable and executable instructions, when executed by a processor, further cause the processor to:
   (a) enable a user to select two arbitrary end-hosts on the network, in order to enable prediction of the performance metrics for communication between the two arbitrary end-hosts that were selected;
   (b) identify clusters that include the two arbitrary end-hosts that were selected;
   (c) automatically select a most likely path between the destination points representing the clusters that were identified; and
   (d) use the performance metrics previously determined for the links comprising the most likely path to predict the performance metrics for communication between the two arbitrary end-hosts that were selected.

* * * * *